(12) United States Patent
Shin et al.

(10) Patent No.: US 12,366,934 B2
(45) Date of Patent: Jul. 22, 2025

(54) TOUCH-SENSITIVE LED DISPLAY

(71) Applicant: Google LLC, Mountain View, CA (US)

(72) Inventors: Dongeek Shin, Mountain View, CA (US); Paul Joseph Silberschatz, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/574,911

(22) PCT Filed: Dec. 30, 2022

(86) PCT No.: PCT/US2022/054354
§ 371 (c)(1),
(2) Date: Dec. 28, 2023

(87) PCT Pub. No.: WO2024/144791
PCT Pub. Date: Jul. 4, 2024

(65) Prior Publication Data
US 2025/0077009 A1 Mar. 6, 2025

(51) Int. Cl.
*G06F 3/042* (2006.01)
*G06F 3/01* (2006.01)
(Continued)

(52) U.S. Cl.
CPC ............ *G06F 3/0412* (2013.01); *G06F 3/017* (2013.01); *G06F 3/042* (2013.01);
(Continued)

(58) Field of Classification Search
CPC ........ G06F 3/017; G06F 3/0412; G06F 3/042; G06F 3/04883; G09G 2310/0224; G09G 2310/08
(Continued)

(56) References Cited

U.S. PATENT DOCUMENTS 7,598,949 B2 * 10/2009 Han ...................... G06F 3/0421
345/173
8,816,985 B1 * 8/2014 Tate .................. G06F 3/041661
345/173
(Continued)

FOREIGN PATENT DOCUMENTS

AU 2015101688 B4 * 2/2016 ........... G06F 1/3215
EP 2907451 A1 * 8/2015 ............... A61B 6/46
(Continued)

OTHER PUBLICATIONS

International Search Report and Written Opinion in International Appln. No. PCT/US2022/054354, mailed on Jul. 10, 2023, 20 pages.

*Primary Examiner* — Julie Anne Watko
(74) *Attorney, Agent, or Firm* — Fish & Richardson P.C.

(57) ABSTRACT

Methods, devices, and media for sensing a touch on a display panel including an array of pixels. A method includes controlling first pixels to operate in an illumination state; controlling second pixels to repeatedly switch between operating in the illumination state and operating in a sensing state; generating sensing signals indicative of levels of light detected by the second pixels; detecting a touch input to the display panel based on the generated sensing signals; and in response to detecting the touch input to the display panel, changing at least one of (i) a frequency at which the second pixels switch between operating in the illumination state and in the sensing state, (ii) a duty cycle for operating the second pixels in the sensing state, or (iii) which of the pixels in the array of pixels are controlled to switch between operating in the illumination state and in the sensing state.

19 Claims, 7 Drawing Sheets

(51) Int. Cl.
 *G06F 3/041* (2006.01)
 *G06F 3/04883* (2022.01)

(52) U.S. Cl.
 CPC . *G06F 3/04883* (2013.01); *G09G 2310/0224* (2013.01); *G09G 2310/08* (2013.01)

(58) Field of Classification Search
 USPC .................................................. 345/173, 175
 See application file for complete search history.

(56) References Cited

U.S. PATENT DOCUMENTS

| | | | |
|---|---|---|---|
| 9,024,643 B2 * | 5/2015 | Schwartz | G06F 3/041662 345/173 |
| 9,207,851 B1 | 12/2015 | Han | |
| 11,726,610 B1 * | 8/2023 | Lin | G06F 3/04166 345/173 |
| 2006/0086896 A1 | 4/2006 | Han | |
| 2007/0229468 A1 | 10/2007 | Peng et al. | |
| 2008/0158167 A1 * | 7/2008 | Hotelling | G06F 1/3265 345/173 |
| 2009/0256810 A1 | 10/2009 | Pasquariello | |
| 2010/0156805 A1 | 6/2010 | Brand et al. | |
| 2012/0127124 A1 * | 5/2012 | Zanone | G06F 3/0446 345/174 |
| 2012/0274596 A1 | 11/2012 | Ludwig | |
| 2013/0215049 A1 * | 8/2013 | Lee | G06F 3/041 345/173 |
| 2013/0321343 A1 * | 12/2013 | Miyamoto | G06F 3/0445 345/175 |
| 2014/0028577 A1 * | 1/2014 | Krah | G06F 3/0446 345/173 |
| 2014/0160067 A1 * | 6/2014 | Kim | G06F 3/04166 345/174 |
| 2014/0270413 A1 | 9/2014 | Slaby et al. | |
| 2014/0292711 A1 * | 10/2014 | Teranishi | G06F 1/26 345/212 |
| 2014/0313146 A1 | 10/2014 | Munechika | |
| 2015/0277539 A1 | 10/2015 | Chueh et al. | |
| 2016/0095173 A1 * | 3/2016 | Diorio | H05B 45/20 315/130 |
| 2017/0115693 A1 * | 4/2017 | Li | G06F 3/0488 |
| 2017/0357379 A1 | 12/2017 | Booth et al. | |
| 2021/0318777 A1 * | 10/2021 | Mao | G06F 3/04166 |
| 2022/0187941 A1 * | 6/2022 | Park | G06F 3/0383 |

FOREIGN PATENT DOCUMENTS

| | | | |
|---|---|---|---|
| EP | 2960755 | 12/2015 | |
| EP | 3136208 A1 * | 3/2017 | ......... G06F 3/03545 |
| EP | 3163420 | 5/2017 | |
| WO | WO 2005114369 | 12/2005 | |
| WO | WO 2016048434 | 3/2016 | |
| WO | WO 2022187069 | 9/2022 | |

* cited by examiner

☐ Pre-Touch Sensing Pixels
◨ Pre-Touch Sensing Pixels that Initially Detected a Touch Input
⊠ Post-Touch Sensing Pixels (Selected for Sensing in Response to Sensed Touch)

TOUCH-SENSITIVE LED DISPLAY

CROSS-REFERENCE TO RELATED APPLICATION

This application is a National Stage Application under 35 U.S.C. § 371 and claims the benefit of International Application No. PCT/US2022/054354, filed Dec. 30, 2022, the disclosure of which is incorporated herein by reference.

TECHNICAL FIELD

This disclosure generally relates to touch-sensitive devices.

BACKGROUND

In general, touch-sensitive panels can be used to detect a user's touch on a surface of a device. Various consumer electronic devices such as laptops and smart phones contain touch-sensitive surfaces to detect user input through a touch. Capacitive touch sensors are typically used for consumer touch applications.

Many devices have multiple layers of flat materials to enable both touch screen and display functionalities for the user. In particular, capacitive touch screen panels are often overlaid on top of display plates. In addition, many designs use multiple capacitive touch sensor layers to be able to detect positions along perpendicular axes (e.g., horizontal and vertical directions along the screen). The need to stack touch screen layers and display layers restricts how thin the screen assembly can be, which results in thicker screens and thicker devices such as smartphones, tablet computers, etc.

SUMMARY

In some implementations, a device includes a LED array that provides a display screen with integrated touch sensing functionality. The touch sensing is provided by the LED elements of the display, so no additional layers (e.g., no dedicated sensing layers) are needed to achieve high-accuracy touch sensing. Rather than using separate resistive or capacitive sensors for touch sensing, the same LED elements in the screen that emit light are used as optical sensors to detect touch on the screen. For example, LED elements for at least some of the pixels of the screen can alternate between emitting light and detecting incident light as a way to detect touch with the screen. By using the LED elements of a screen for touch sensing, the overall thickness of the screen assembly can be reduced, because layers for touch sensing (e.g., capacitive sensing layers) are no longer needed. This allows for thinner smartphones and other touch-screen enabled devices. The use of the LED array for both display output and touch sensing also reduces the number of components needed for a touchscreen and can reduce the overall complexity and cost of the display.

LEDs can emit light in display screens and can also be used to detect light when bias of the LEDs is reversed. Using this capability, a device, such as a smartphone, can be configured to use at least some of the LEDs in a screen (e.g., LEDs of some pixels of the LED display) to sense ambient light for detecting and localizing user touches on the screen. When a user touches the screen, the user's finger covers and darkens the LEDs in the screen region touched. As LEDs operated in the sensing mode are covered, the change in incident light causes the sensing output of LEDs operated in the sensing mode to change, which allows the device to detect and localize the user's touch to the areas with decreased incident light. To provide high accuracy and responsiveness across the screen, the set of LEDs used for sensing can be optionally spaced apart along a two-dimensional grid, to detect touch and both vertical and horizontal movement across the screen.

The LEDs used for sensing can be switched between a light emission mode of operation (e.g., "display mode" or "illumination mode") and a light sensing mode of operation (e.g., "sensing mode"). In the display mode, the LEDs are forward biased and can emit light to present content on the display. In the sensing mode, LEDs are reverse biased and do not emit light as they would in the display mode. As a result, the LEDs would appear dark while operating in the sensing mode, in contrast with their previous appearance while in display mode or compared with adjacent LEDs currently operating in display mode. To minimize the impact of sensing on display output, the display system can drive the LEDs used for sensing to alternate between the display mode and the sensing mode with a duty cycle in which the display mode has a higher proportion of time than the sensing mode. For example, in a default state in which no touch input is currently being received, the duty cycle for the sensing mode may be 25% or less, to minimize the effect that sensing has in reducing apparent brightness of the involved pixels.

To maintain high quality of display output, the set of pixels that are used for sensing (e.g., pixels that cycle between display mode and sensing mode) can be a subset of the total pixels of the display. The pixels to be used for sensing can spatially distributed among other pixels that remain in display mode without cycling to sensing mode. For example, the pixels used for sensing can be spaced apart in a regular pattern, such as at vertices in a rectangular grid. Thus, sensing can be spatially distributed among the LED array, in addition to the temporal distribution of sensing through the duty cycle assigned. As discussed further below, the set of pixels used for sensing can change over time, such as in response to touch inputs to the display or to changes in the content presented on the display. For example, a higher density of pixels can be used for sensing in areas where touch input is occurring or is expected to occur. As another example, the device can specify that pixels corresponding to certain content for display (e.g., pixels representing dark colors, text, high-contrast edges, etc.) are used for sensing, to further minimize the difference between pixels used for sensing and adjacent pixels that are not currently being used for sensing.

The display system can adaptively change the parameters for sensing touch input, including dynamically changing the duty cycle for sensing, the frequency at which sensing operations occur, and/or the set of pixels used for sensing. The display system selects pixels to be used for sensing, and the display system can drive the pixels to perform a series of display and sensing cycles. For example, the display system can perform one or more cycles per second, where each cycle has the selected pixels operate in display mode for a period and operate in sensing mode for a period. Before a touch is detected, the sensing mode period may be less than half of the duration of the cycle, such as 20% or 10% of the cycle duration. Because a relatively small number of the display pixels are used for sensing, and these pixels are operated in sensing mode for a small proportion of the time, the sensing results in minimal disruption of the displayed content and in many cases may not be noticeable to the user. When a touch on the screen is detected, the display system can adaptively change the sensing characteristics to increase touch sensing accuracy, for example, by increasing the rate of sensing, increasing the proportion of each cycle used for sensing, and/or increasing or changing which pixels are used for sensing. The changes to sensing procedure can be localized to a subset of the display (e.g., to the regions where touches are detected and/or are expected to occur), to increase accuracy in the areas in and around touch inputs without reducing the quality of display output in areas not being touched.

Adaptive changes to sensing behavior of the display can provide a combination of high display quality and high sensing accuracy, including significantly higher display quality and sensing accuracy than systems that do not make adaptive changes. The adaptive system can overcome challenges that have limited prior systems. For example, frequent sensing may be desirable to provide low latency detection of touch input. However, fast switching of display pixels between an illumination state and a sensing state is often not very user friendly, because it can introduce significant visual jitter. In addition, fast switching can increase the computational power, since many more sensing inputs would need to be evaluated. On the other hand, if switching between sensing and illumination modes is too slow, then there can be a noticeable delay in sensing a touch, leading to poor user interaction experiences. To address this tradeoff, a display system can use adaptive techniques to change the temporal and spatial characteristics of sensing and achieve higher performance than static systems. For example, the display system can vary sensing parameters such as frequency of sensing and duty cycle of sensing based on the state of user interaction (e.g., whether a touch is occurring or not). When there is no touch input, the system can use a low frequency and/or low duty cycle for sensing to provide high quality output with minimal effect on display quality. When there is a touch input detected, the system can use a higher frequency and/or higher duty cycle for sensing to provide low-latency, high-performance sensing at the times it is most needed. In addition, sensing at a high rate or high density of pixels can be localized to regions where touch input is occurring or is predicted to occur based on tracked touch movements. In this way, low-frequency can be performed with a low spatial density of sensing pixels in areas a user is not touching, while areas being touched can perform sensing with high frequency and high spatial density of sensing pixels to maximize responsiveness. This can have the additional benefit of localizing the highest density of sensing pixels to regions of the display that are occluded or are otherwise less noticeable, effectively hiding display distortions that might arise due to high-frequency sensing.

Various implementations of the present disclosure use an LED array for simultaneous display and sensing functions. A display system can use optical flow analysis of movement of a user's finger path along the display to predict where touch inputs will occur and to adaptively adjust the how the LED array is used for sensing. This adaptation can include changes in the temporal sensing characteristics (e.g., duty cycle, frequency of sensing, etc.) as well as the spatial sensing characteristics (e.g., locations where sensing occurs, spacing among pixels used for sensing, density of pixels used for sensing, etc.). Based on the detected and predicted regions of touch input to the display, the display system can operate with different sensing parameters at different times, as well as simultaneously apply different sensing parameters to different locations of the display.

As an example, when no user interaction is occurring, a subsampled grid of an LED array modulates, or switches, between illumination (display) and sensor (touch screen) states at a low rate, e.g., 2.0 Hz with a ten percent duty cycle. Due to the low frequency and duty cycle, the modulation is often not noticeable to the user. When a user interaction occurs, and a touch is detected, then the display enters a higher rate of modulating between the illumination and sensing states localized to a touch zone where the touch was detected and regions around the touch zone. The higher rate may be, for example, 20 Hz with a fifty percent duty cycle. With the finger occluding the touch zone, the higher rate of modulation is also typically not noticeable to the user. This selective high sensing rate, limited spatially around the user touch zone and limited temporally to the duration of the user touch, takes advantage of the property that with a finger occluding the touched zone the user would not be able to view the content below and so would not notice display changes resulting from high-frequency sensing. As the user moves the finger around the display panel in and around the touch zone, an optical flow algorithm and a path regression framework are locally applied to predict the upcoming touch trajectories. Based on the predicted trajectories, pixels are selectively activated and deactivated for sensing to accurately track the user's touch without degrading the image presented to the user on the display.

Among other advantages, implementations of the device described herein may enable decreased thickness of electronic devices. The adaptive LED modulation technology can achieve feature parity with conventional displays, enabling low-latency touch sensitivity without comprising display quality. Integration of touch capabilities with an LED array reduces the number of layers of a display panel, thereby reducing complexity and cost of manufacture. Reduction in the number of layers of the display panel can improve durability and bendability of the display panel, and can enable flexibility of panel design. For example, the disclosed techniques can be implemented in curved displays.

In one general aspect, a method is provided for sensing a touch on a display panel. The display panel can include an array of pixels comprising light emitting diodes (LEDs). The method can include: controlling first pixels from the array of pixels to operate in an illumination state in which LEDs of the first pixels are forward biased to emit light; controlling second pixels from the array of pixels to repeatedly switch between operating in the illumination state and operating in a sensing state, wherein the second pixels include pixels that are interspersed with the first pixels in the array of pixels, wherein operating the second pixels in the illumination state comprises forward biasing the LEDs of the second pixels to emit light, and wherein operating the second pixels in the sensing state comprises reverse biasing the LEDs of the second pixels to detect light; generating sensing signals indicative of levels of light detected by the second pixels while the second pixels operate in the sensing state; detecting a touch input to the display panel based on the generated sensing signals indicative of levels of light detected by the second pixels; and in response to detecting the touch input to the display panel, changing at least one of (i) a frequency at which the second pixels switch between operating in the illumination state and operating in the sensing state, (ii) a duty cycle for operating the second pixels in the sensing state, or (iii) which of the pixels in the array of pixels are controlled to switch between operating in the illumination state and operating in the sensing state.

In some implementations, controlling the first pixels comprises controlling the first pixels over a period of time in which the first pixels provide visual output of the display and in which the first pixels are not operated in the sensing mode; and controlling the second pixels comprises controlling the second pixels to perform multiple cycles of switching between the illumination state and the sensing state during the period of time.

In some implementations, when operating in the illumination state, the second pixels provide visual output of the display concurrent with the first pixels providing visual output of the display.

When operating in the sensing state, the second pixels provide sense light incident to the second pixels concurrent with the first pixels providing visual output of the display.

In some implementations, generating the sensing signals comprises generating a sensing signal for each of the second pixels to indicate a level of light detected by the pixel; and detecting the touch input to the display panel comprises: evaluating the sensing signals to determine whether the sensing signals respectively indicate a level of light below one or more thresholds; and detecting the touch input based on identifying a subset of the second pixels for which the sensing signals indicate a level of light below the one or more thresholds.

In some implementations, detecting the touch input to the display panel comprises: based on the sensing signals, identifying a subset of the second pixels for which the sensing signals indicate a reduction in the detected level of light or a detected level of light below a threshold; and determining a location of the touch input on the display panel based on locations in the array of pixels of the second pixels in the identified subset of the second pixels.

In some implementations, detecting the touch input to the display panel comprises detecting a size, a shape, and a location of the touch input on the display based on the generated sensing signals.

In some implementations, the method includes: while the touch input is provided to the display, continuing to switch the second pixels between operating in the illumination state and operating in the sensing state, wherein sensing signals are generated for the second pixels for each of multiple periods of operating the second pixels in the sensing state while the touch input is provided to the display; and tracking movement of the touch input along the display based on the sensing signals determined over the multiple periods of operating the second pixels in the sensing state.

In some implementations, generating the sensing signals comprises generating, for each of the second pixels, a sensing signal based on a voltage or current across an LED of the second pixel while the LED is in a reverse-biased condition.

In some implementations, controlling the second pixels to repeatedly switch between operating in the illumination state and operating in the sensing state comprises switching the second pixels between the illumination state and the sensing state to initiate sensing at a predetermined frequency.

In some implementations, controlling the second pixels to repeatedly switch between operating in the illumination state and operating in the sensing state comprises switching the second pixels between the illumination state and the sensing state to achieve a predetermined duty cycle for operation of the second pixels in the sensing state.

In some implementations, the method includes: selecting, from among the array of pixels, the second pixels to be used in sensing touch input, where the first pixels are pixels that the display controller does not select as the second pixels to be used in sensing touch input; selecting a frequency at which to perform sensing operations using the second pixels; and selecting a duty cycle at which to operate the second pixels in the sensing state. Controlling second pixels comprises driving the second pixels to initiate operation in the sensing state at the selected frequency and to maintain the second pixels operating in the sensing state with durations set to achieve the selected duty cycle.

In some implementations, the second pixels are spaced apart in a regular pattern, with one or more first pixels separating the second pixels.

In some implementations, the second pixels are located at vertices of a rectangular grid of the array of pixels.

In some implementations, the method includes: selecting, from among the array of pixels, a set of pixels to use as the second pixels to be switched between the illumination state and the sensing state; and using the same selected set of pixels as the second pixels for multiple cycles that each include a period of operation in the illumination state and operation in the sensing state.

In some implementations, a set of pixels in the array of pixels are each configured to be able to selectively operate in the illumination state and in the sensing state. The method includes selecting a proper subset from the set of pixels in the array as the second pixels that are switched between the illumination state and the sensing state, and wherein the other pixels from the set of pixels that are not in the proper subset are selected as first pixels to operate in the illumination sensing without switching to the sensing state.

In some implementations, each of the pixels in the array of pixels are configured to be able to selectively operate in the illumination state and in the sensing state.

In some implementations, the method includes selecting, from the array of pixels, pixels to be operated as the second pixels to sense touch input during presentation of an image frame on the display panel, wherein the second pixels are selected based on content in the image frame.

In some implementations, the method includes identifying portions of the image frame that have a color of a predetermined value or in a predetermined range or that have an intensity or brightness that satisfies a threshold. Selecting the pixels to be operated as the second pixels comprises selecting, as second pixels, at least some pixels of the pixel array that are located to present identified portions of the image frame determined to have a color of the predetermined value or in the predetermined range or that have an intensity or brightness that satisfies the threshold.

In some implementations, the method includes identifying portions of the image frame determined to have an intensity or brightness below a predetermined threshold. Selecting the pixels to be operated as the second pixels comprises selecting, as second pixels, at least some pixels in the pixel array that are located to display identified portions of the image frame determined to have an intensity or brightness below the predetermined threshold.

In some implementations, the method includes varying which pixels of the array of pixels are used as the second pixels to sense touch input over time based on changes to content displayed on the display panel over time.

In some implementations, the method includes: selecting a set of pixels for inclusion in the group of pixels during presentation of a first image frame on the display panel; and selecting a different set of pixels for inclusion in the group of pixels during presentation of a second image frame on the display panel.

In some implementations, the method includes controlling the second pixels from the array of pixels to repeatedly switch between operating in the illumination state and operating in the sensing state comprises initiating operation of the second pixels in the sensing state at a first frequency. The method comprises in response to detecting the touch input to the display panel, controlling at least some of the second pixels to initiate operation of the second pixels in the sensing state at a second frequency that is higher than the first frequency.

In some implementations, controlling the second pixels from the array of pixels to repeatedly switch between operating in the illumination state and operating in the sensing state comprises operating the second pixels in the sensing state at a first duty cycle. The method includes, in response to detecting the touch input to the display panel, controlling at least some of the second pixels to operate in the second pixels in the sensing state a second duty cycle that is greater than the first duty cycle.

In some implementations, the method includes varying which pixels of the array of pixels are used to sense touch input based on whether touch input is detected at the display panel.

In some implementations, selectively varying touch sensing characteristics of the display panel in regions of the display panel where touch input is detected, comprising: based on detecting the touch input in a particular region of the display panel, causing a change to touch sensing in the particular region that includes one or more of changing which pixels in the particular region are used as second pixels used to sense touch input in the particular region; increasing a number or density of pixels in the particular region that are controlled to operate as second pixels used to sense touch input in the particular region; increasing a frequency of initiating sensing using the second pixels in the particular region; or increasing a duty cycle with which second pixels in the second region operate in the sensing state.

In some implementations, the method includes selectively varying touch sensing characteristics of the display panel based on touch input, comprising: after detecting the touch input in a particular region of the display panel and changing touch sensing characteristics based on detecting the touch input, detecting an end to the touch input or detecting that the touch input moved out of the particular region; and in response to detecting the end to the touch input or detecting that the touch input moved out of the particular region, causing a change to touch sensing in the particular region that includes one or more of: changing which pixels in the particular region are used as second pixels used to sense touch input in the particular region; decreasing a number or density of pixels in the particular region that are controlled to operate as second pixels used to sense touch input in the particular region; decreasing a frequency of initiating sensing using the second pixels in the particular region; or decreasing a duty cycle with which second pixels in the second region operate in the sensing state.

In some implementations, generating the sensing signals comprises determining, for each of the second pixels, a touch score based on a level of light sensed by the second pixel while operating in the sensing state, wherein the touch score indicates a likelihood that a touch input occurred at the second pixel.

In some implementations, the method includes identifying a cluster of the second pixels having corresponding sensing signals that satisfy one or more criteria that indicate a likelihood of touch input that exceeds a specified threshold; evaluating a size or shape of a region defined by the cluster of the second pixels; and classifying the region as a region of touch input to the display panel based on the evaluation of the size or shape of the cluster of the second pixels.

In some implementations, evaluating the size or shape of the cluster of the second pixels comprises at least one of: determining that the region is larger than a predetermined minimum size; determining that the region is smaller than a predetermined maximum size; determining that the region defined by the cluster has at least a predetermined minimum level of convexity; or determining that the second pixels in the cluster have touch scores that satisfy the one or more criteria for sensing outputs over a duration that at least a predetermined minimum amount of time.

In some implementations, the method includes: determining a touch region of the display panel where the touch input occurred; and based on determining the touch region, causing a set of the first pixels located in the touch region to switch between operating in the illumination state and the sensing state.

In some implementations, controlling the second pixels to repeatedly switch between operating in the illumination state and operating in a sensing state comprises performing sensing using the second pixels with a first frequency and a first duty cycle; and causing the set of the first pixels located in the touch region to switch between operating in the illumination state and the sensing state comprises performing sensing using the set of the first pixels located in the touch region to perform sensing with a second frequency that is higher than the first frequency and/or a second duty cycle that is higher than the first duty cycle.

In some implementations, the method includes selecting the set of first pixels by performing operations that include: generating touch scores for pixels operated in the sensing state, the touch score for a pixel indicating a likelihood of a touch at the location of the pixel; based on the touch scores, determining boundaries of the touch region, wherein the touch scores for pixels within the boundaries of the touch region satisfy a predetermined touch score threshold; performing a bounded circle regression to identify a circular area that is within the boundaries of the touch region; and selecting, for inclusion in the set of first pixels, pixels located within the circular area of the display panel.

In some implementations, the set of first pixels has a greater spatial density than the second pixels.

In some implementations, the method includes: detecting movement of the touch input to the display panel based on light detected by the second pixels; based on detecting the movement of the touch input, determining a predicted direction of motion of the touch input; and selecting groups of pixels to switch between the illumination state and the sensing state based on the predicted direction of motion.

In some implementations, the method includes determining the predicted direction of motion of the touch input using optical flow analysis.

In some implementations, the second pixels comprise one percent or less of the pixels of the array of pixels.

Implementations of the above techniques include methods, apparatus, systems and computer program products. A suitable computer program product can be suitably embodied in a non-transitory machine-readable medium that stores instructions executable by one or more processors to perform the actions of the methods and other techniques discussed herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Techniques are described for using an LED array as both a display screen and a sensor input surface. The disclosed techniques use a selective spatiotemporal switching mechanism to detect touch on a display panel of a device while minimizing image distortions. The disclosed techniques can be implemented to integrate multiple sensing and display components in a single panel layer, reducing the thickness compared to devices that require additional touch screen sensor electrode layers to enable touch sensing.

Figure 1:
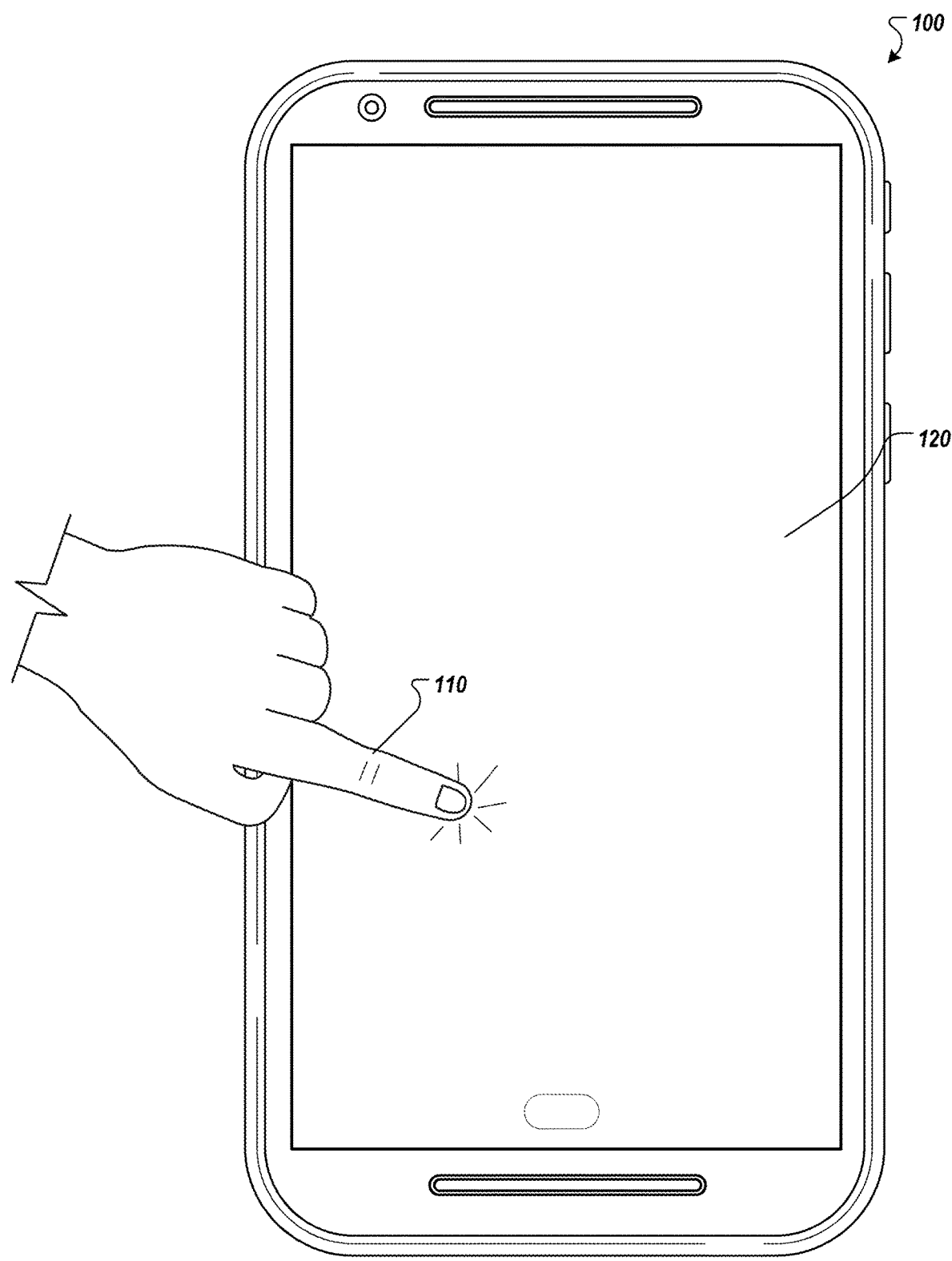
FIG. 1 shows an example electronic device with a touch-sensitive display panel.

FIG. 1 shows an example electronic device 100 with a display 120. As a few examples, the electronic device 100 can be a smart phone, a tablet computer, a laptop computer, a television, a smart watch, or a handheld game console. In this example, the electronic device 100 is a mobile telephone and the display 120 is a display panel of the mobile telephone.

The display 120 is configured to sense contact by a user. For example, FIG. 1 illustrates an individual contacting the display 120 with finger 110. The display 120 can be configured to receive a touch input and generate a touch input signal based on the location of the touch. The display 120 can also generate the touch input signal based on other characteristics of the touch, e.g., a number of touches, a path of a touch swipe, a size or shape of the touch input, etc. The touch input signal can indicate various properties of the touch, such as the location on the display 120, the area covered by the touch, the direction and speed of movement of the touch (e.g., the path or trajectory), and so on.

An electronic control module of the electronic device 100 can be configured to receive the touch input signal and to perform an action based on the received touch input signal. For example, based on the received touch input signal, the electronic control module may perform an action such as illuminating the display, opening an application, or scrolling the content displayed on the electronic device 100.

The display 120 includes an array of light-emitting pixels. In operation, the display 120 can display an image by illuminating the light-emitting pixels. The display 120 may be, for example, a light-emitting diode (LED) display, a mini-LED display, a micro-LED display, an organic light-emitting diode (OLED) display, a passive-matrix OLED display, an active-matrix OLED display, etc.

Unlike some other displays, the display 120 uses the LEDs in the array for both illumination (e.g., providing visual output) as well as sensing of touch input. To detect touch inputs to the display 120, selected pixels (e.g., a proper subset of the LEDs in the array) are repeatedly switched between an illumination state and a sensing state. For example, pixels selected to be used in sensing spend the majority of time in the illumination state, but are periodically switched to the sensing state for a brief duration before returning to the illumination state. For example, a pixel may be controlled to operate in a sensing state for a time duration of one millisecond or less. Because the selected pixels are in an illumination state more than they are in the sensing state, the impact of sensing is often not noticeable in the displayed image.

In order to avoid compromising display quality, the selected pixels are small in number compared to the total number of pixels of the array. For example, the ratio of pixels that are modulated to the total number of pixels of the array may be 0.01 or less, 0.005 or less, or 0.001 or less. The selected pixels can be sparsely allocated throughout the display panel. Since the selected pixels are a small percentage of the total number of pixels, jitter and artifacts can be avoided in the displayed image.

While the example electronic device 100 shown in FIG. 1 includes a single display 120, in general, the electronic device 100 may have multiple touch-sensitive surfaces. For example, a top half of the computing device may have a first touch-sensitive surface and the bottom half of the computing device may have a second touch-sensitive surface. As another example, the rear side of the computing device may have a first touch-sensitive surface and the side surfaces of the computing device may have a second touch-sensitive surface. While the electronic device 100 includes a flat display 120, In some implementations the display 120 may be curved.

Figure 2:
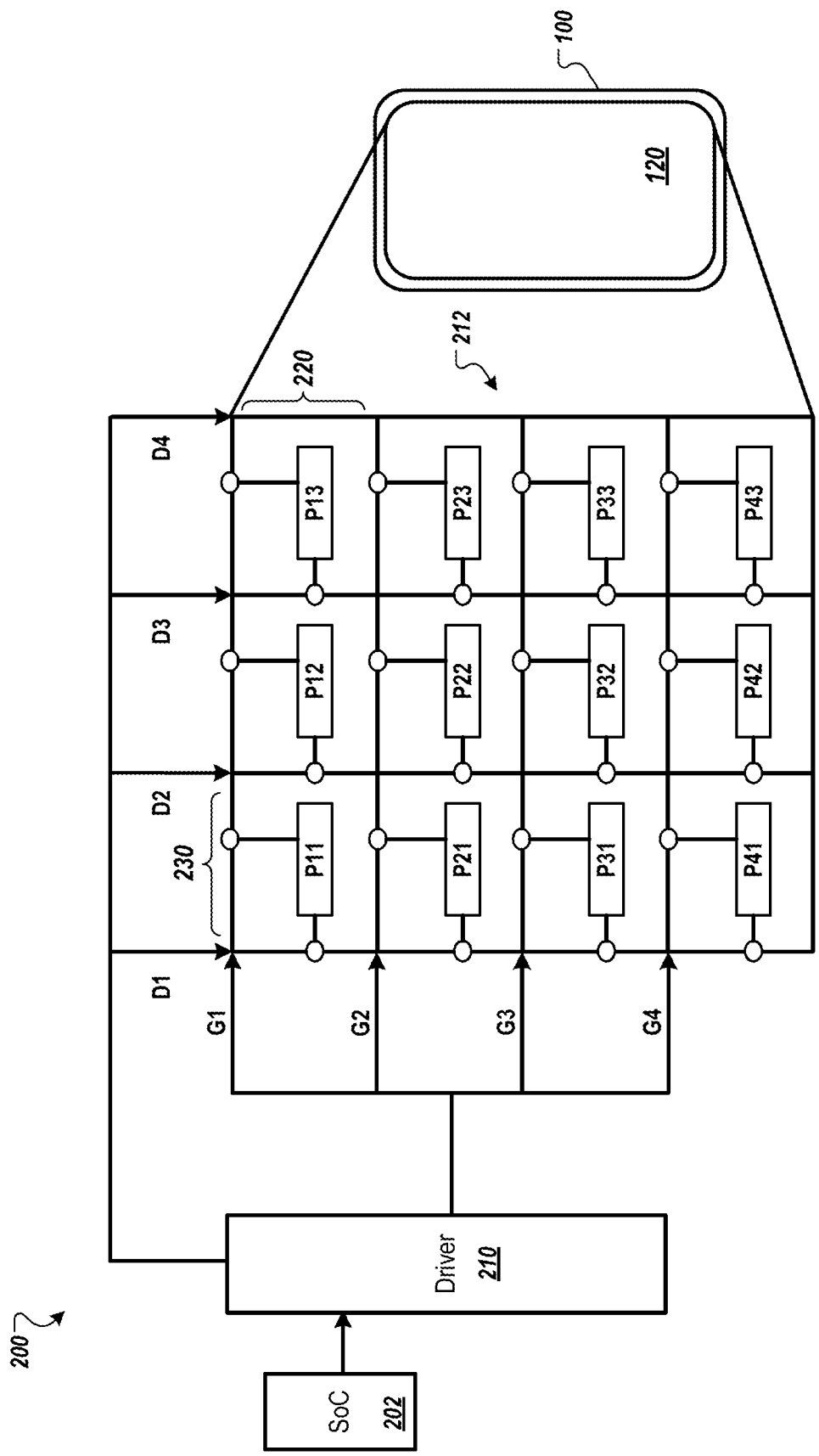
FIG. 2 is a diagram of an example display system of an electronic device.

FIG. 2 is a diagram of an example display system 200 of the electronic device 100. For example, the display system 200 can show in further detail the display 120 and associated electronics used to drive the display 120. The display system 200 is an LED display system that includes an array 212 of light emitting pixels. The pixel array 212 may be located under a cover glass of an electronic device. Each light emitting pixel includes an LED. A driver 210 is configured to use the array of LED pixels to sense touch inputs to the display panel by switching groups of the LED pixels between an illumination state and a sensing state. The driver 210 can include multiple driver circuits, e.g., a row driver circuit and a column driver circuit.

In general, during operation of the display system 200, the driver 210 selects a row of pixels in the display, and data voltages are provided to the pixels in the selected row. The pixel circuits generate electric current that corresponds to the data voltage, and provide the current to LEDs of the pixel, enabling the selected LEDs to emit light, and presenting an image on the display. Signal lines such as gate lines and column data lines may be used in controlling the pixels to display images on the display.

The light intensity of a pixel may be represented by a grayscale value. Pixel light intensities can be represented as grayscale values that include integers from zero to two hundred fifty-five, representing an example 8-bit grayscale display. Other grayscale value ranges can be used. For example, grayscale values may range from zero to 1023 for a 10-bit display, or from zero to 65535 for a 16-bit display. Other possible grayscale value ranges may include a range from zero to one, with fractional values in between, and a range from zero percent (%) to 100%.

For a full color display that spatially synthesizes color, each pixel may include multiple color channels, or subpixels. In some implementations, each pixel may include each of a red, green, and blue (RGB) subpixel. The light intensities of each subpixel may be represented with grayscale values as described above, e.g., integers from zero to two hundred fifty-five for an 8-bit display.

The display system 200 includes the pixel array 212 that includes a plurality of light-emitting pixels, e.g., the pixels P11 through P43. A pixel is a small element on a display that can change color based on image data supplied to the pixel. Each pixel within the pixel array 212 can be addressed separately to produce various intensities of color. The pixel array 212 extends in a plane and includes rows and columns.

Each row extends horizontally across the pixel array 212. For example, the first row 220 of the pixel array 212 includes pixels P11, P12, and P13. Each column extends vertically down the pixel array 212. For example, the first column 230 of the pixel array 212 includes pixels P11, P21, P31, and P41. Only a few pixels are shown in FIG. 2 for simplicity. In practice, there may be several million pixels in the pixel array 212. Greater numbers of pixels can result in higher image resolution.

The display system 200 includes a system-on-a-chip (SoC) 202. The SoC 202 can include a central processing unit (CPU), a graphics processing unit (GPU), and a memory. The SoC 202 can generate image data and send the image data to the driver 210.

The driver 210 supplies gate signals to rows of the pixel array 212 via gate lines G1 to G4. The driver 210 supplies data signals to columns of the pixel array 212 via column data lines D1 to D4. Each pixel in the pixel array 212 is addressable by a horizontal gate line and a vertical column data line.

The gate lines are addressed sequentially for each frame. A frame is a single image in a sequence of images that are displayed. A scan direction determines the order in which the gate lines are addressed. In the display system 200, the scan direction is from top to bottom of the pixel array 212. For example, the gate line G1 is addressed first, followed by the gate line G2, then G3, etc.

The driver 210 can control the state of operation of each pixel, as instructed or managed by the SoC 202. For example, for each image frame, the SoC 202 and/or the driver 210 can designate which pixels operate in an illumination state and which pixels operate in a sensing state. The driver 210 controls the state of operation of each pixel by setting the bias of each pixel appropriately. For example, the driver 210 forward biases LEDs to operate them in the illumination state and reverse biases LEDs to operate them in the sensing state. When forward biased, LEDs emit light which is used to produce a display image. When reverse biased, LEDs can act as photodiodes and can each measure an amount of incident light that is present.

In the illumination state, the driver 210 provides an RGB value for the pixel to illuminate, which is used to set appropriate current levels that cause the LEDs of the pixel to produce the desired color and intensity of emitted light. To switch a pixel from the illumination state to the sensing state, the driver 210 can switch the LEDs of the pixel from forward bias (e.g., having a positive voltage and positive current through the LEDs) to reverse bias (e.g., having a negative voltage applied and negative current can develop through the LEDs). In the sensing state, incident light produces a leakage current or photocurrent that is directly proportional to the intensity of the light, flowing in the opposite direction of normal forward-biased current flow in an LED.

To measure the incident light, the display system 200 can include elements to sense the photocurrent that develops for each pixel (or for each LED of each pixel) during the sensing state due to incident light. For example, a resistor (e.g., a shunt resistor or current sense resistor) can be placed in the path of the photocurrent for each LED, and the voltage drop across the resistor can indicate the level of photocurrent developed and thus the level of light incident to the LED. Various amplifiers and other elements can be used to measure the photocurrent(s) developed for each pixel and produce sensing signals indicative of the intensity of light detected by the pixel. The sensing signals can be converted to digital values and be provided to the driver 210 and/or SoC 202 for processing and detection of touch input.

In some implementations, transistors can be used to selectively route current through or around the sensing resistor depending on the operating mode selected for the pixel. For example, when operated in the illumination state, the transistors can place the LEDs of a pixel in a path to provide forward voltage bias and to bypass the sensing resistor(s) used for sensing photocurrent. By contrast, when operated in the sensing state, the transistors can connect the LEDs of the pixel to the reverse bias voltage and can switch the sensing resistor(s) into a series connection with the LEDs. As a result, the SoC 202 and/or driver 210 can be configured to control sensing elements to be selectively used according to the operating state selected for each pixel. A sensing resistor or other sensing element can be included for each pixel or for each LED or for each color channel of the pixel. In some implementations, operating in the sensing state involves sensing using each LED or color channel of a pixel individually (e.g., measuring photocurrent in red, green, and blue LEDs separately), using a single LED or single color channel of the pixel (e.g., measuring only photocurrent from the green LEDs in a pixel), or using multiple LEDs of a pixel together to determine a combined level of photocurrent (e.g., measuring a total or combined photocurrent across all multiple LEDs of a pixel or all LEDs of a pixel).

In the sensing state, each subpixel can generate a signal indicating an intensity of light detected in a wavelength range corresponding to the subpixel. In some implementations, each subpixel generates a signal indicating an intensity of light at or below the emitted wavelength of the subpixel. For example, the red subpixel outputs a signal indicating an intensity of detected light having wavelengths equal to or shorter than those corresponding to red light. The blue subpixels outputs a signal indicating an intensity of detected light having wavelengths equal to or shorter than those corresponding to blue light.

In some implementations, pixels can include one or more additional channels. For example, a pixel can include a white subpixel, an infrared subpixel, or both. The additional channel or channels can increase the bandwidth of the pixel and therefore improve the ability of a pixel to detect light.

In some implementations, the LED array is configured so that each of the pixels of the LED array is capable of being operated in the illumination mode and in the sensing mode. The SoC 202 and/or driver 210 select, from among the pixels in the array, which pixels are used for sensing or for illumination at a given time.

Figure 3A:
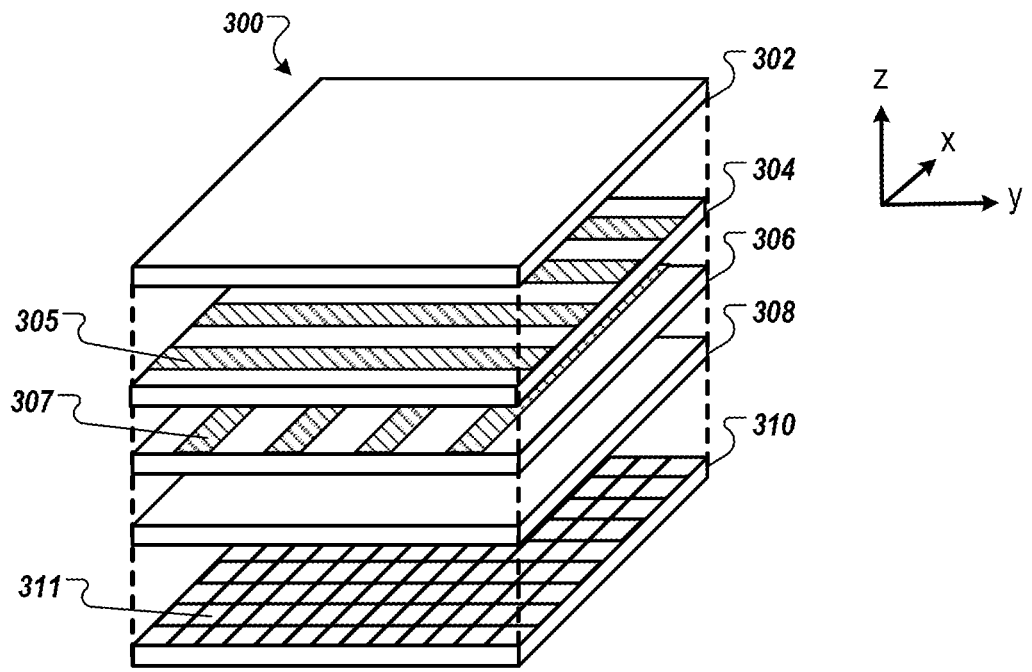
FIG. 3A illustrates an exploded view of a section of an example display panel that includes capacitive touch screen panels.

FIG. 3A illustrates an exploded view of a section of an example display panel 300 that includes capacitive touch screen sensors. In the display panel 300, the layers that enable touch sensing are different from the layers that provide display functionality.

The display panel 300 includes a cover glass 302, an upper display plate 308, and a lower display plate 310. The lower display plate 310 includes an array of pixels 311. Each pixel 311 can include multiple subpixels. For example, each pixel 311 can include a red subpixel, a green subpixel, and a blue subpixel.

The display panel 300 includes an upper capacitive touch screen layer 304 and a lower capacitive touch screen layer 306. The upper capacitive touch screen layer 304 includes sensor electrodes 305 extending along the y-direction. The lower capacitive touch screen layer 306 includes sensor electrodes 307 extending along the x-direction. Together, the capacitive touch-screen layers 304, 306 enable input to be localized in the x and y directions. The upper capacitive touch screen panel 304 and the lower capacitive touch screen panel 306 are overlaid on top of the upper display plate 308 and the lower display plate 310.

Figure 3B:
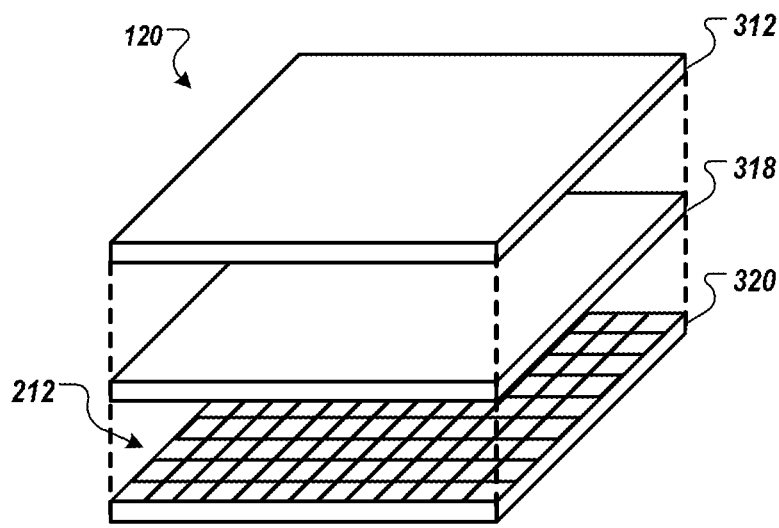
FIG. 3B illustrates an exploded view of a section of an example display panel with touch sensing and display capabilities integrated into a single layer.

FIG. 3B illustrates an exploded view of a section of the display 120 of the device 100 of FIG. 1. The display 120 has touch sensing and display capabilities both provided by the LED array of the display 120. The display panel includes a layer of cover glass 312, an upper display plate 318, and a lower display plate 320. The lower display plate 320 includes the array of pixels 212, e.g., LED pixels, as described in FIG. 2.

Unlike the example of FIG. 3A, the display 120 does not include capacitive touch sensing electrodes and does not include or require any dedicated touch sensors. Instead, the display 120 is configured to selectively operate some of the LEDs in a sensing state (e.g., a photoconductive or photodetector mode) to detect touch input. The same LEDs that provide display output are selectively used to sense touch input. As discussed further below, a subset of the pixels are used in the sensing state, where the pixels used for sensing are spaced apart spatially and also are operated intermittently in the sensing state (e.g., with periods of sensing interspersed between periods of operating in the illumination mode). The device 100 also can shift and adapt the selection of which pixels to use for sensing as well as the timing of the sensing operations.

Because LEDs can be operated to emit light or to detect light, the pixels 212 can be used as light sensors to detect ambient light in their respective locations in the display 120, and this functionality can be used to detect touch inputs. While all of the pixels 212 may be capable of operating in the sensing state and the illumination state, at any given time, the majority of the pixels 212 can be operated in an illumination state to display an image to the user. Concurrently, a subset of the pixels 212 can be operated in the sensing state, to temporarily detect light without providing illumination. The subset of pixels 212 selected for sensing operation are controlled to switch between operation in the illumination state and operation in the sensing state. As a result, even the pixels used for sensing touch input display information to the user intermittently between sensing periods. Typically, the pixels used for sensing touch input remain in the illumination state longer than the sensing state. For example, the device 100 sets a duty cycle for sensing (e.g., the proportion of time that a pixel selected to be used for sending operates in the sensing state) that is 50% or less. Lower sensing duty cycles can provide higher image quality, for example, by reducing the apparent difference in intensity for pixels that alternate between the sensing state and the illumination state and also to reduce appearance of flicker or jitter that may result from alternating between the states. Accordingly, the sensing duty cycle can be set to 50% or less, e.g., 50%, 40%, 30%, 20%, 10%, 5%, etc.

When a user touches the display 120 and covers a pixel operating in the sensing state, the touch decreases or blocks incident light to the pixel, which decreases in the photocurrent developed in the LEDs of the pixel compared to the baseline photocurrent developed before the touch (e.g., due to incident ambient light or in some cases from other pixels of the display 120). The display system 200 detects the decrease in photocurrent and can use this to determine that a touch input has occurred. As a result, based on changes in intensity of light received at pixels operating in the sensing state, the pixels 212 of the lower display plate 320 can detect a touch on the cover glass 312. The device 100 can identify the set of pixels that experienced the decrease in photocurrent to localize the touch on the display 120 and determine the size, shape, and other properties of the touch contact. Therefore, the display 120 can display an image and concurrently detect touches without any capacitive touch sensing elements. The display 120 is thinner and easier to manufacture than the display panel 300, as it removes the capacitive sensing layers 304, 306.

Figure 4A:
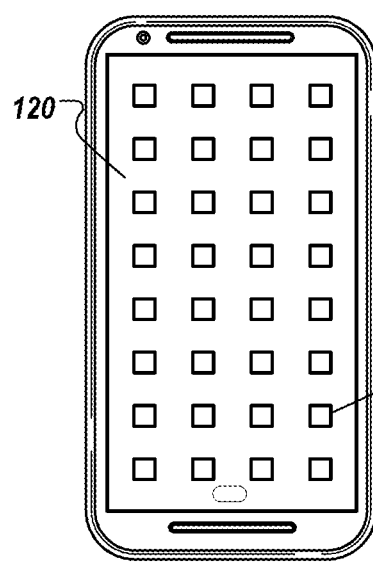
FIG. 4A illustrates an example display panel before detecting a touch input.
Figure 4B:
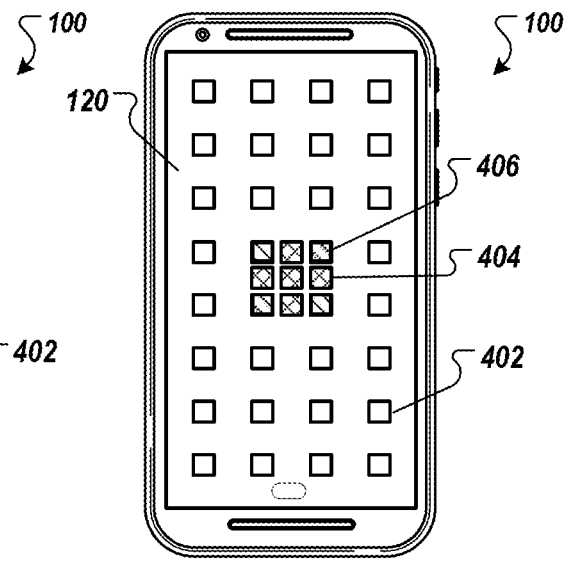
FIG. 4B illustrates an example display panel after detecting a touch input.

FIGS. 4A-4B show an example of the device 100 using selected subsets of pixels for sensing. Depending on the conditions, the device 100 can adaptively change sensing behavior, including changing the subset of pixels used for sensing and changing the timing and duration of sensing operations. In the example, the device 100 can initially use a first subset of the pixels in the array of pixels 212 for sensing when no user touch input is provided (FIG. 4A). Then, when a user touch input is detected at the display 120, the device 100 adaptively changes the sensing behavior of the display 120, including changing the subset of pixels used for sensing, to provide high accuracy for sensing and tracking the touch that is occurring.

FIG. 4A illustrates an example of the display 120 before detecting a touch input. To provide touch sensing while maintaining high-quality image output, the device 100 selects a subset of the pixels in the array of pixels 212 to be used for sensing (e.g., to alternate between illumination state and sensing state). The pixels selected to cycle between the two operating states are referred to as sensing pixels, and the SoC 202 and driver 210 controls the operation of pixels selected to be used as sensing pixels to periodically switch between the illumination state and the sensing state. The pixels not selected as sensing pixels are operated normally without sensing, e.g., operated consistently in the illumination mode.

The device 100 can select pixels to be used for sensing so that the sensing pixels are distributed throughout the display 120, allowing touch inputs to be detected over the full extent of the display 120. In addition, the sensing pixels can be spaced apart from each other. For example, the sensing pixels can be selected to provide a sparse grid across the display 120 (e.g., with sensing pixels at vertices or intersection points of a rectangular grid). This spatial sampling allows high-resolution sensing with minimal impact on image output quality of the display 120. The spatial sampling also reduces the number of sensing inputs generated which can reduce the processing demands for interpreting the sensing inputs.

In FIG. 4A, a set of sensing pixels 402 are selected with grid spacing, which provides a consistent, regular distribution of sensing pixels 402 on the display 120. The spacing of sensing pixels 402 can be set according to the accuracy needs of the display 120. For example, if desired for touch sensing to have accuracy or resolution to within 1 mm, and if the display has a display resolution of 10 pixels per millimeter, then the sensing pixels 402 can be placed with a density of at least one sensing pixel 402 every 10 pixels along the display 120. As another example, if touch inputs are expected to have a minimum width and height of at least 3 mm, and if the display 120 has a resolution of 10 pixels per millimeter, then the sensing pixels 402 can be spaced apart with at least one sensing pixel 402 every 30 pixels of the display 120. The density and spacing of sensing pixels 402 can be varied depending on the accuracy needs of the task or activity. For example, the device 100 can select a grid that is more dense or more sparse for different software applications running on the device 100, different user interface views, or even for different areas of a single user interface view, depending on the level of accuracy needed.

The example of FIG. 4A shows a spacing for sensing pixels 402 that represents a default condition when there is no user touch input currently occurring. The device 100 can be configured to use a low-density arrangement of sensing pixels 402 in this condition, and to operate the sensing with a low sensing duty cycle and a low frequency of performing initiating sensing operations. In the default condition (e.g., no current touch), this arrangement of sensing pixels 402 has the objective and capability to reliably detect when a touch occurs (e.g., when a new input begins), but does not require high-resolution accuracy or high-frequency sensing. As a result, when a user is viewing the display 120 but not actively providing touch input, the device 100 uses an arrangement of sensing pixels 402 that will minimally impact the image quality provided by the display 120. When a touch input is detected, the device 100 can select additional sensing pixels to increase the density of sensing pixels in the region where the touch occurs, to increase the accuracy for measuring more precisely the size, shape, contours, speed, and path of the touch input, as discussed further with respect to FIG. 4B.

In some implementations, the device 100 designates and uses a specific group of sensing pixels 402 and uses the same group of pixels repeatedly or consistently when no touch input is provided. For example, a group of pixels can be selected as sensing pixels 402 to use in no-touch-input conditions (e.g., a group for low-intensity, low-density sensing), and the set of pixels can remain the same over time (e.g., across many different image frames or screen refreshes, for several seconds at a time, for multiple user sessions of using the device 100, across multiple sleep/wake cycles of the device 100, etc.). Each time a touch input ends, the device 100 can return to the default sensing mode that uses the same designated group of sensing pixels 402. The sensing pixels 402 will then be used in the default low-density, low-intensity sensing mode until the next touch input is detected.

Figure 5:
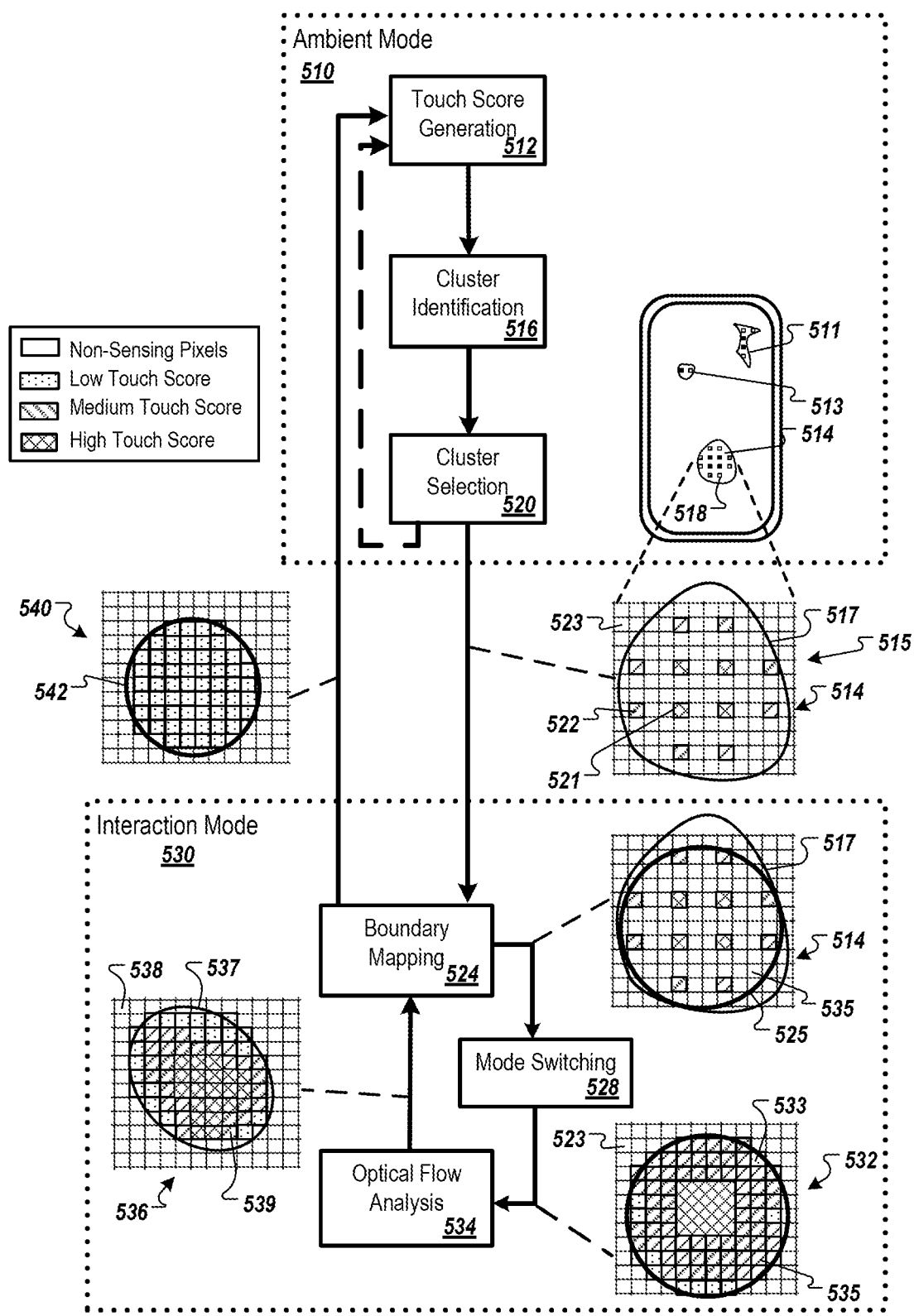
FIG. 5 illustrates a block diagram of an example system for detecting and tracking touch inputs to a display panel using LED pixels.

When operating as shown in FIG. 4A, the device 100 uses the driver 210 and/or SoC 202 to analyze the sensing outputs generated by the sensing pixels 402, which is described further in FIG. 5. When the sensing outputs for one or more sensing pixels 402 indicate a significant decrease in light intensity, e.g., detected as a decrease in photocurrent that satisfies a threshold, the device 100 can detect the change as a touch input. In response to detecting a touch input using the sensing pixels 402, the device 100 can change various parameters for sensing in order to better characterize the current touch input (e.g., to more accurately determine the location, size, shape, border, duration, etc.) and to better track movement of the touch input along the display 120. The device 100 can change which pixels are used as sensing pixels and can also change the timing of sensing operations (e.g., sensing duty cycle and frequency of sensing measurements). For example, the driver 210 can change the spatiotemporal modulation of sensing on the display 120, for example, to change the distribution of sensing pixels in the display 120 (e.g., locations of sensing pixels, amounts of sensing pixels used, density of sensing pixels, etc.) and/or to change the timing properties of sensing operations.

FIG. 4B illustrates the example display 120 after detecting a touch input, and while the touch input continues on the display 120. Of the sensing pixels 402 shown in FIG. TA, a subset of these pixels, sensing pixels 406, detect a touch on the display 120. The device 100 responds by adjusting the set of pixels used for sensing, so that a different set of sensing pixels are selected compared to the set used immediately prior to the touch input. The sensing pixels 402 from FIG. TA are still used as sensing pixels (e.g., operated to alternate between the sensing state and illumination state). In addition, the device 100 selects additional sensing pixels 404 located in the region where the touch input was detected (e.g., adjacent to and between the sensing pixels 406 that initially detected the touch input). By adding the additional sensing pixels 404, the device 100 increases the spatial density of sensing pixels that are located at or near the location of the initial touch input to the display panel. For example, the amount of post-touch sensing pixels 404 per unit of area or linear distance on the display 120 is greater than the number of pre-touch sensing pixels 402 per unit of area or linear distance on the display 120.

The added sensing pixels 404 provide a localized increase in the density of sensing pixels, which increases the spatial sensing accuracy in the specific region of the display 120 where high-accuracy sensing is needed, e.g., the region where the touch input occurred and is ongoing. The added sensing pixels 404 are located in the region being touched, which is typically occluded by the user's finger while the touch input continues. As a result, the increased sensing can enhance sensing accuracy and responsiveness in the area where it is most needed, and the user will not perceive a change in brightness in that area because it is occluded by the user's own touch input. By increasing the density of sensing pixels in and around the touched region(s) where touch inputs are currently or recently detected, the device 100 can maximize accuracy and responsiveness of touch sensing at the touched region(s) without degrading image quality at other areas of the display 120.

In some implementations, the added sensing pixels 404 can include all pixels located within a touched region of the display 120. In some implementations, the post-touch sensing pixels 404 can include a sampling of pixels that are located within a touched region of the display 120 (e.g., a subset of pixels in the touched region, such as grid with higher density than the arrangement of the pixels 402). The selection of post-touch sensing pixels 404 is described in greater detail with reference to FIG. 5.

Figure 4C:
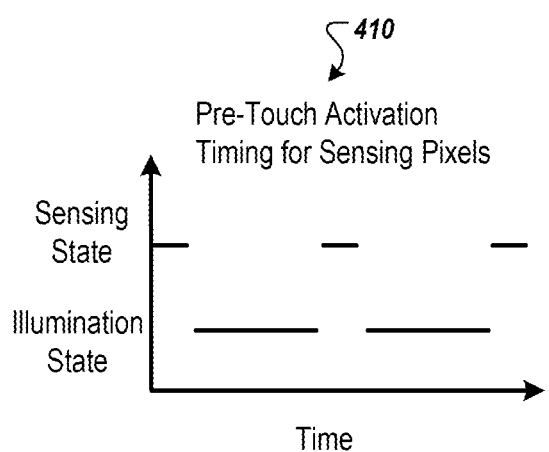
FIG. 4C is an example timing diagram of sensing pixels before detecting a touch input.
Figure 4D:
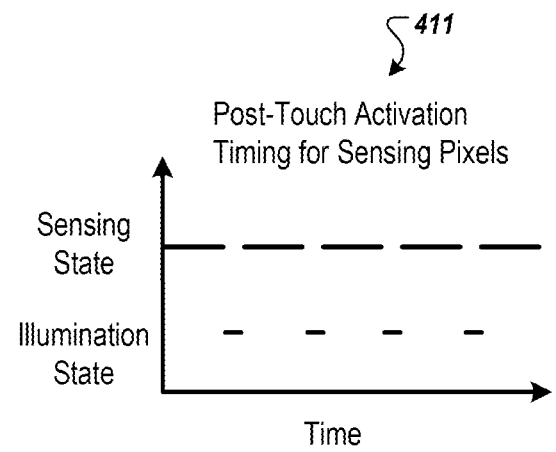
FIG. 4D is an example timing diagram of sensing pixels after detecting a touch input.

FIGS. 4C and 4D are charts showing different timing characteristics that can be used for performing sensing operations with sensing pixels. The figures show how different timing characteristics can be used adaptively in different situations to adjust accuracy and responsiveness of touch sensing, whether for the display 120 as a whole or for localized regions. For example, after a touch input is detected, the device 100 increases the proportion of time that at least some of the sensing pixels (e.g., sensing pixels at or near the touch input) are operated in the sensing state.

FIG. 4C is an example timing diagram 410 for the operation of sensing pixels before detecting a touch input. The diagram 410 shows a relative amount of time that each pre-touch sensing pixel 402 is in a sensing state. Before a touch input is detected, the pre-touch sensing pixels 402 modulate between the illumination state and the sensing state at a first frequency and with a first duty cycle.

The first frequency may be, for example, 2.0 Hz with a first duty cycle of ten percent. At a frequency of 2.0 Hz, a sensing pixel switches into the sensing state once every 0.5 seconds. With a duty cycle of ten percent, the sensing pixel is in the sensing state ten percent of each cycle. Thus, each time the sensing pixel switches into the sensing state, the sensing pixel remains in the sensing state for 0.05 seconds.

FIG. 4D is an example timing diagram 411 for the operation of sensing pixels after detecting a touch input. In response to detecting a touch input with pixels 406, the device 100 changes the frequency of sensing measurements and the duty cycle for sensing measurements to increase the accuracy of detection of touch inputs. The changes to sensing frequency and duty cycle can be made for all sensing pixels (e.g., the initially selected set of pixels 402 in the grid), or more selectively for sensing pixels at or near the location of the detected touch (e.g., for pixels 406 and 404, but not for the pixels 402).

The diagram 410 shows relative amounts of time that each post-touch sensing pixel 404 is operated in the sensing state and the illumination state. After a touch input is detected, the post-touch sensing pixels 404 are modulated between the illumination state and the sensing state at a second frequency and with a second duty cycle. In some implementations, the second frequency is higher than the first frequency, so that changes to a current touch input (and new touches) are detected with reduced latency. In some implementations, the second duty cycle is higher than the first duty cycle used before the touch input, so that the precision and reliability of touch input is increased for the times and screen locations where touch input is currently occurring and/or is predicted to be highly likely. The changes made in response to the first touch input adjust the tradeoff between touch sensing quality (e.g., accuracy, precision, and latency) and visual display quality to prioritize touch sensing quality at times and locations where touch inputs are occurring or are expected to occur. Although the high frequency and high duty cycle for sensing may result in visual artifacts that could be visible to a user (e.g., flicker, darker pixels), by limiting the high-frequency and high duty cycle operation to the area of touch, most or all of the region operating in this manner will be occluded by the user's finger or hand, limiting the extent to which visual artifacts can be seen by the user.

The second frequency may be, for example, 20 Hz with a duty cycle of fifty percent. At a frequency of 20 Hz, a sensing pixel switches into the sensing state once every 0.05 seconds. With a duty cycle of fifty percent, the sensing pixel is in the sensing state fifty percent of each cycle or time period considered. Thus, each time the sensing pixel switches into the sensing state, the sensing pixel remains in the sensing state for 0.025 seconds. The diagram 410 shows an even higher duty cycle, where at least the sensing pixels 404 selected in response to a touch are operated in the sensing state longer than in the illumination state.

Referring again to FIG. 4A, in some implementations, the device 100 varies which pixels are used as sensing pixels, so that the group of sensing pixels used when no touch input is provided is variable. For example, a first group of pixels can be selected as pre-touch sensing pixels 402 at a first time, and a different group of pixels can be selected as pre-touch sensing pixels 402 at a second time. For example, the device 110 can switch between different grid arrangements or spacings of the sensing pixels 402, or may shift or offset the grid arrangement from time to time.

The device 100 can be configured to select the sensing pixels based on the content presented on the display 120. As a result, regardless of any touch input, the device 100 can change the set of sensing pixels used over time, based on content (e.g., images, text, etc.) to be presented by the display panel 120. For example, a group of pixels can be selected as sensing pixels during presentation of an image frame based the colors or intensity levels to be assigned to pixels in the image frame to be displayed. In general, it is preferably to designate sensing pixels at regions of the display 120 where the darkest content will be displayed. Pixels do not provide illumination when in the sensing state, which can lower the perceived brightness of the pixel, and the reduction in brightness will be less noticeable for pixels assigned to display darker colors. For example, a sensing pixel at a region assigned to present the color black will be less noticeable to the user than a sensing pixel in a region assigned to display the color white. As a result, the selection of pixels as sensing pixels can be biased to preferentially select pixels that are displaying darker colors over pixels that are display lighter colors.

To implement variable placement of sensing pixels, the device 100 (e.g., using the SoC 202 and/or the driver 210) can analyze an image frame to be displayed to identify the darker regions of the image frame. The device 100 can then select the sensing pixels to locate them in the dark regions of the image frame. The device 100 can refresh the selection of sensing pixels periodically, potentially for each image frame (e.g., each refresh of the display contents), or at another interval (e.g., every other image frame, every 5 image frames, etc.). In addition to or instead of considering the color or intensity to be displayed at pixels, the device 100 can select sensing pixels based on other properties of the image content to be displayed, such as the location of edges or boundaries between different colors or items of content, contrast in different regions of the image frame, or the content type in a region (e.g., text, lines, borders, edges, variance in color or intensity in a region). For example, designating sensing pixels at or within text characters (instead of in surrounding whitespace) and designating sensing pixels at high-contrast edges can effectively mask or make less noticeable the reduction in illumination that results from intermittent operation in the sensing mode.

When selecting sensing pixels adaptively based on the content being displayed, the device 100 can enforce various criteria so that a predetermined level of coverage and detection accuracy are maintained. This can be done by permitting the location of sensing pixels 402 to be shifted to areas of darker content while applying constraints on the distance that the sensing pixels can be moved or the resulting density of sensing pixels. For example, the device 100 may be configured to prefer using sensing pixels in darker regions, but may constrain the placement to achieve a predetermined minimum density or a maximum distance between sensing pixels to achieve a desired level of touch sensing accuracy. As an example, the display 120 may have 10 pixels per millimeter and the device 120 set a constraint that touch sensing accuracy should be within 5 millimeters (e.g., at least one sensing pixel every 50 pixels). The device 100 may begin with a preliminary grid arrangement such as shown in FIG. 4A, but with one sensing pixel every 20 pixels of the display 120. The device 100 can then assess, for each sensing pixel in the grid, the color or brightness of content to be displayed at pixels in a local region around the sensing pixel. For example, for each grid position, the device 100 can set a local search area as a two-dimensional region that extends from 10 pixels above the grid position to 10 pixels below the grid position, as well as from 10 pixels to the left of the grid position and 10 pixels to the right of the grid position. The device 100 can identified a pixel position within each search area that meets certain criteria, such as being assigned to provide the darkest output among the search area (e.g., the pixel position where the lowest brightness or luminous intensity is to be displayed), and the identified pixel positions can be used as the locations of sensing pixels. In this example, the device 100 can shift each sensing pixel in a grid up to ten pixels vertically and/or horizontally to find the least visible location. The constraints on the amount of movement can ensure that the desired level of sensing accuracy (e.g., to within less than 5 mm) is still maintained.

As an example, the driver 210 can receive image data indicating that, for a particular image frame, a first pixel has a lower RGB pixel value (e.g., lower intensity, representing a darker output), and a second pixel has a higher RGB pixel value (e.g., higher intensity, representing brighter output). The driver 210 can select the first pixel as a sensing pixel, preferring it over the second pixel that has the darker output. In addition to or instead of selecting sensing pixels in dark regions, this technique can be used to place sensing pixels in pixels located to display text, borders, high-contrast edges, or other features.

In some implementations, the driver 210 of the display panel can select sensing pixels such that the sensing pixels are spread over the area of the display panel. For example, the driver 210 of the display panel can select sensing pixels subject to satisfying criteria for a minimum spatial density of sensing pixels. In some implementations, the area of the display 120 can be divided into segments (e.g., shapes such as squares, triangles, polygons, etc. that span the display 120), and the driver 210 of the display 120 can select sensing pixels subject to satisfy criteria for a minimum number of sensing pixels in each segment.

FIG. 5 illustrates a block diagram of processing operations for detecting and tracking touch inputs to a display panel using LED pixels. The operations can be performed by a processor of the device 100, such as by the driver 210 or the SoC 202 of the display system 200.

The example shows two groups of operations, representing an ambient mode 510 and in an interaction mode 530. In general, the device 100 operates in the ambient mode 510 when no touch is detected by the display panel. The device 100 operates in the interaction mode 530 when at least one touch is detected by (e.g., currently present at) the display panel 120. The ambient mode 510 and the interaction mode 530 have two different spatiotemporal modulation schemes for performing sensing. The device 100 can switch between the ambient mode 510 and the interaction mode 530 as input to the display 120 changes. In addition, the device 100 can perform the operations of both modes 510, 530 concurrently. For example, the device 100 can analyze sensor measurements and analyze clusters of potential touch sense results using the techniques of the ambient mode 510 for some regions of the display 120, while concurrently characterizing touch inputs and tracking touch movement using the techniques of the interaction mode 530 for regions of the display 120 where touch input is determined to be occurring.

The operations represented in FIG. 5 can each be implemented using hardware modules, software modules, or a combination of both. For example, some or all of the functions of a touch score generation 512, a cluster identification 516, cluster selection 520, boundary mapping 524, mode switching 528, and optical flow analysis 534 can be performed by software modules and/or as electronic circuitry.

As an overview, FIG. 5 shows how the device 100 can monitor the measurement values provided by sensing pixels designated to be used for touch sensing, both to detect and locate touch input as well as to adjust or adapt the properties used for sensing (e.g., which pixels to use for sensing, frequency of sensing, duty cycle for sensing, etc.). As sensing occurs, sensing pixels provide measurement values indicating the respective levels of light intensity that they detect. The device 100 analyzes the values to determine which indicate a light level sufficiently low that they likely represent touch (e.g., a score indicating a detected light level below a threshold, or a decrease in light level from one measurement to the next where the decrease has a magnitude of at least a predetermined threshold amount). The device 100 then considers the sensing pixels in aggregate, finding clusters of sensing pixels that represent regions on the display 120 where different touches may be occurring. For example, the device 100 can identify different contiguous regions, identified by all or most of the sensing pixels in the region having touch sensing scores that meet predetermined criteria. The device 100 can then analyze the shape, size, and other characteristics of the identified regions or clusters to filter out regions or clusters that are inconsistent with intentional touch input. This filtering can distinguish legitimate touch inputs, which typically have a rounded or oval shape, from other situations that may decrease the amount of light sensed, e.g., shade on a portion of the screen 120 or the side of a user's hand against the screen 120.

When the device 100 has identified a cluster of sensing outputs that together represent a touch input, the device 100 performs the further operations of the interaction mode 530 for that cluster. The processing of the interaction mode 530 can be performed concurrently for each of multiple clusters or regions where touch input occurs concurrently. For each cluster determined to represent touch input, the device 100 determines a boundary for the touch input, such as by fitting a circle or oval shape to the cluster to better define the location and perimeter of the touch input. This can represent a region where the device 100 has high confidence that the touch is occurring. The device 100 registers the detected touch and indicates the location and size of the touch to the operating system or other software configured to handle user input. In addition, the device 100 adapts the touch sensing characteristics used in the local region of the touch input. For example, the device 100 can select a greater number (e.g., a greater density) of pixels in the region of the touch to be used as sensing pixels, and the device 100 can also increase the frequency and/or duty cycle of touch sensing in the region. The device 100 can also use the properties of a sequence of sensing measurements over time to determine the trajectory of touch movement (e.g., the direction and speed of a finger swipe motion). The device 100 can use the trajectory to also adjust sensing properties, such as to enable sensing using pixels that are in the trajectory ahead of the current touch location, to provide higher-resolution sensing in the screen region where touch input is expected to occur. After a touch input ends and sensing measurements indicate ambient levels of light are again detected, the device 100 returns to the ambient mode 510 for the screen region where the touch region previously occurred, which prioritizes visual quality of the screen while touch input is not occurring.

In further detail, the device 100 can initially perform touch score generation 512 to determine generate scores for each of the pixels selected as sensing pixels. In the ambient mode 510, a sparse grid of sensing pixels is used to intermittently sense incident light levels before a touch input is detected. For each measurement cycle, the device 100 generates touch scores for each of the pixels selected as sensing pixels. This results in an array of touch scores each indicating the level of light detected by the corresponding sensing pixel.

The touch score indicates a likelihood of a touch at the location of a pixel. In general, a higher touch score having a value closer to a value of one indicates a higher confidence of a touch occurring at the pixel location. A lower touch score having a value closer to a value of zero indicates a lower confidence of a touch occurring at the pixel. The touch score can be based on the illuminance measured by the pixel. Illuminance is a luminous flux per unit area, and can be measured in units of lumens per square meters, or lux. The touch score for a sensing pixel can be specified as the inverse of the illuminance, so that lower illuminance indicates a higher likelihood that a touch input is occurring.

An example relationship between touch score and illuminance is provided by Equation 1:

$$\text{TOUCH\_SCORE} = SOFT\text{MAX}(1/LUX) \qquad \text{Eq. 1}$$

In Equation 1, the variable "LUX" represents the illuminance, and the softmax function normalizes the inverse of the illuminance value in order to obtain touch scores that range from zero to one. The touch score can be a value between zero and one that is related to the inverse lux of the pixel, such that a decrease in lux results in a higher touch score.

As an example, when a user's finger touches the display 120 and fully occludes a first pixel, the lux value is very low so the inverse lux value of the first pixel is very high, resulting in a touch score close to a value of one. On the other hand, if the finger only partially occludes a second pixel, the second pixel will receives some light from the environment. The inverse lux value of the second pixel is less than that of the first pixel, and the touch score for the second pixel is less than the touch score for the first pixel. For example, the touch score for the second pixel may be 0.5 or another intermediate value that indicates some dimming but not full occlusion. As another example, a third pixel that is not occluded by the finger may have a high lux value thus a low inverse lux value, so the touch score for the unoccluded pixel is close to a value of zero (e.g., 0.2, 0.1, 0.05, etc.).

In some implementations, the touch score for a pixel can be a weighted or unweighted combination of the touch scores for subpixels of the pixel. In some cases, the total touch score for a pixel can be biased to prioritize certain subpixels. For example, a red subpixel can be prioritized over a green or blue subpixel due to having a greater sensing bandwidth (e.g., sensing a wider range of wavelengths) than the green and blue subpixels. The contribution of the red subpixel to the total touch score can therefore be weighted more than the contributions of the green and blue subpixels. In another example, a pixel can include an infrared subpixel, and the touch score of the infrared channel can be weighted more than the touch scores of the red, green, or blue subpixels.

In general, the ambient light conditions in the environment of the device 100 may vary significantly over time, especially from daytime to nighttime, or from indoors to outdoors. Nevertheless, by defining the touch scores as discussed above the effects of varying external ambient light changes can be limited. For example, the variation in ambient light levels may affect scores significantly at the lower levels of the touch score range (e.g., touch scores of less than 0.5), but across a wide range of ambient light levels, the highest range of the touch score range (e.g., 0.8 and higher, 0.9 and higher, etc.) can still reliably represent occlusion due to touch. In very dim ambient conditions, light emitted from the display itself can sometimes contribute to the incident light to the sensing pixels, so that user touch still reduces the detected incident light and increases the touch score.

The device 100 determines touch scores for each of the sensing pixels for a current sensing cycle or display frame. In some implementations, the touch scores can provide an array of touch values similar to a heat map, where each value in the array has a corresponding location on the screen (e.g., a coordinate location of the sensing pixel in the screen) and a touch score for the pixel.

After the touch scores have been determined, the device 100 performs cluster identification 516 based on the touch scores. The device 100 identifies groups of pixels that represent regions on the display 120 where touch inputs may be occurring. One technique for identifying these clusters or regions is to perform thresholding, and to identify regions where the touch values satisfy a threshold, e.g., areas where the touch scores are greater than 0.8, 0.9, or another predetermined minimum threshold. The device 100 can detect a cluster of pixels as, for example, a group, island, or blob of sensing pixels that have touch scores that satisfies the threshold.

In the illustrated example, the device 100 identifies three clusters of pixels, clusters 511, 513, and 514. The clusters represent distinct regions on the display 120 in which the touch scores for sensing pixels satisfy the threshold. Each cluster can represent a contiguous region of the display, and the clusters can represent separate, non-overlapping sets of sensing pixels. Each of the clusters 511, 513, and 514 is a candidate touch input where a touch may have occurred, and these candidates will be evaluated further.

The device 100 can be configured to perform additional processing to improve detection for very low ambient light levels. For example, when ambient light is high and the average (e.g., mean) touch score for the display, taken across the full set of sensing pixels, can be relatively low and a predetermined threshold can be set to represent the occurrence of a touch. For example, the mean touch score may be 0.3 and the threshold for a touch can be 0.9, so that values of 0.9 or higher are interpreted as a touch input. However, the device 100 can monitor the mean touch score for the display and adjust the touch input threshold if the mean touch score becomes too high or if another light sensor (e.g., camera, light detector, etc.) indicates low light. For example, if the mean touch score reaches 0.7, the device 100 may determine that a higher threshold may be needed for reliability, and so a touch input threshold of 0.95 may be used.

As another example, the device 100 can improve reliability of detecting inputs by considering not only the current touch scores (e.g., for the current measurement cycle) but also previous touch scores (e.g., for one or more previous measurement cycles). For example, the device can detect a change in touch score for a pixel, with respect to a running average touch score for the pixel (e.g., over the previous 0.1 seconds, 1 second, etc.) of at least a minimum magnitude, such as by at least 0.1, 0.2, 0.3, etc. An actual touch will have not only a high touch score (e.g., a low level of incident light), but also an increase in touch score in a relatively brief duration, as the user's finger touches the screen. The device 100 can use these and other properties to better distinguish actual touch events in low light conditions, when the average or typical brightness may be nearer to the normal touch input threshold score.

After identifying clusters of sensing pixels with high touch scores, the device 100 evaluates the clusters 511, 513, 514 and selects clusters that likely correspond to a finger touch, and thus an intended user input. The cluster selection 520 can evaluate the clusters 511, 513, 514 based on features of the clusters such as sizes and shapes of the clusters. As a result, the cluster selector 520 can distinguish instances of low illuminance caused by a finger touch from instances caused by shade, leaning on the display 120, placing the display in a pocket or bag, and so on.

To evaluate a cluster, the device 100 can determine, for each cluster identified, whether the cluster has certain properties expected for finger touches, such as convexity, at least a minimum size or area, less than a maximum size or area, and so on. Each cluster has a boundary determined based on the touch scores. The device 110 can evaluate a shape of the cluster's boundary to determine if the shape satisfies criteria for representing a finger touch, such as the presence of a convex shape. The cluster selector 520 can filter the clusters by selecting clusters that have a convex shape for further processing, and rejecting clusters that have a concave shape. In the example of FIG. 5, the cluster selector 520 determines that the cluster 511 does not satisfy shape criteria for representing a finger touch due to having a concave shape. The device 100 determines that the clusters 513, 514 do satisfy shape criteria due to having convex shapes. As a convexity test, the device 100 can determine the maximum area of an ellipse that would fit within the boundary of a cluster, and determine the percentage of area of the cluster that is covered by the ellipse. The device 100 then checks whether the covered area satisfies a threshold by providing at least a minimum percentage of the area of the cluster.

The device 100 can also determine a size of each cluster based on the determined boundary of the cluster. The size of a cluster can be determined based on, e.g., a total number of pixels within the boundary, a total number of sensing pixels within the boundary, or a size of the display area located within the boundary.

The device 100 can evaluate a size of the cluster to determine if the size of the cluster satisfies criteria for representing a finger touch. The device 100 can filter out the clusters by selecting clusters that have a size that is within size limits associated with finger touches. Size limits can include a specified range between a minimum size and a maximum size. The device 100 can reject clusters that have sizes outside of the size limits. Example size limits for representing a finger touch may include a minimum cluster diameter of twenty total pixels, and a maximum cluster diameter of one hundred pixels.

In the example of FIG. 5, the device 100 determines that the cluster 513 does not satisfy size criteria for representing a finger touch due to being too small. The device 100 determines that the clusters 511, 514 do satisfy size criteria for representing a finger touch due to having sizes within the size limits.

Based on evaluating the shape and size of the boundaries of the clusters, the device 100 filters the clusters by rejecting clusters 511 and 513 so that they are not considered to represent user input. The device 100 selects the cluster 514 as satisfying shape and size criteria for representing a finger touch, and thus an intended user input.

Selection of the cluster 514 as meeting criteria for a user input indicates a user interaction has occurred, so the device performs processing for the interaction mode 530. The device 100 uses the selected cluster 514 to perform boundary mapping 524. An initial boundary is determined based on the touch scores, and the shape is often an irregular blob. The device 110 then fits a circle to the area spanned by the cluster 514.

Grid 515 shows the selected cluster 514 and touch scores for the sensing pixels of the cluster 514 in further detail. The grid 515 shows a first set of sensing pixels 521, shaded black, having a high touch score. A second set of sensing pixels 522, represented with a diagonal shading pattern, have a medium touch score. The first set of sensing pixels 521 and the second set of sensing pixels 522 can be considered pre-touch sensing pixels, as the pixels 521, 522 are assigned to be sensing pixels during the ambient mode 510 prior to detection of a touch. The remaining pixels of the grid 515, e.g., pixel 523, are non-sensing pixels in the ambient mode and are white.

The device 100 generates a bounded circle within each cluster selected by the device 100 as a likely user input. For example, the boundary mapper 524 generates a circle 525 within the boundary 517 of the cluster 514. The circle 525 designates an area of the display 120 where there is highest confidence that the user's finger is located, which is also the area where a high sensing rate will be most useful and least visible to the user. At a high sensing rate, additional pixels can be activated as sensing pixels in order to accurately track the touch input. At a high sensing rate, the sensing pixels can switch more quickly between the illumination state and the sensing state. The sensing pixels can also remain in the sensing state for longer durations of time (e.g., a higher duty cycle).

To generate the circle 525, the boundary mapper 524 performs a circle regression within the touch region within the boundary 517. To perform the bounded regression, the boundary mapper 524 computes a centroid of the bounded area and centers a shape such as a circle or ellipse at the centroid. The boundary mapper 524 then iteratively increases the radius of the shape. For each iteration, the boundary mapper 524 compares the area of the shape with the area of the intersection of the circle with the bounded area. If the area of the shape deviates from the area of the intersection of the shape with the bounded area by a threshold deviation or greater, the previous iteration is selected as the output. Thus, the boundary mapper 524 generates a shape, e.g., circle 525, that has a common centroid with the touch region and is enclosed within the boundary 517 of the touch region.

Once the circle 525 is determined, the device 100 increases the density of sensing pixels in the circle 525. For example, the device 100 performs mode switching 528 to perform a localized change in operating mode for pixels in the circle 525, so that a higher frequency of duty cycle is used for sensing and/or a higher density of sensing pixels is used to track the touch input. The device 100 can switch a mode of the sensing pixels 521, 522, from a lower frequency of sensing to a higher frequency of sensing. Switching the mode of the sensing pixels 521, 522 can increase the frequency at which the sensing pixels 521, 522 switch into the sensing state. Switching the mode of the sensing pixels 521, 522 can also increase the duty cycle of the sensing states of the sensing pixels 521, 522.

In some implementations, the mode switcher 528 switches modes of some or all pixels within the circle 525, so that pixels not previously selected for sensing become operated in the sensing mode. For example, the mode switcher 528 can select certain additional pixels within the circle 525 to assign as sensing pixels, to increase the density of pixels used as sensing pixels within the circle 525. For example, pixel 535 was not used as a sensing pixel in the ambient mode 510, but based on the pixel 535 being located within the circle 525, the device 100 can select to operate the pixel 535 as a sensing pixel in response to the current touch input. Once assigned as a sensing pixel, the pixel 535 can switch between the illumination state and the sensing state. The pixel 535 can be considered a post-touch sensing pixel, as the pixel 535 is assigned to be a sensing pixel in the interaction mode after the touch was detected.

In some implementations, the device 100 can use all pixels within the circle 525 for sensing, e.g., by selecting to assign all pixels within the circle 525 as sensing pixels. In some implementations, the device 100 can activate a fraction of non-sensing pixels within the circle 525. For example, the device 100 may select to activate ten percent of all non-sensing pixels within the circle 525. The activated pixels then alternate between the illumination state and the sensing state.

Because the circle 525 is within the touch region defined by the boundary 517, the pixels within the circle 525 are likely occluded from view by the user's finger. Therefore, entering the high sensing rate within the circle 525 (e.g., increasing the number of sensing pixels, increasing the frequency of sensing pixel state switching, and maintaining sensing pixels in the sensing state for longer time durations) does not adversely impact the user's experience viewing the display 120.

The grid 532 shows example touch scores when the pixels within the circle 525 operate at a high sensing rate. Compared to the grid 515, the grid 532 show more pixels used for sensing and having touch scores. The pixel 535, represented with a diagonal pattern, has a touch score with a medium level. The pixel 533, represented with a dotted pattern, has a touch score with a low level. The pixel 523, outside of the circle 525, is not used for sensing and so remains in illumination mode without any touch score being generated.

In addition to increasing accuracy and precision of touch input in the area of a detected touch, the device 100 can use optical flow analysis 534 to detect, track, and anticipate movement of a touch along the display 120. For example, based on detecting the movement of the touch input, the device 100 can determine a predicted trajectory of the user's finger (e.g., based on changes in positions of a centroid of the touch input over sequence of measurement cycles). The predicted trajectory can include, for example, a direction of motion of the touch input, a predicted speed of motion of the touch input, or both.

To detect and track movement of the touch input, the device 100 can determine an optical flow based on the touch scores of the sensing pixels within the circle 525. The optical flow can be determined, for example, using Lucas-Kanade optical flow analysis. The Lucas-Kanade optical analysis of finger track assumes that flow is essentially constant in a local neighborhood of a pixel, and solves optical flow equations for all the pixels in the neighborhood using a least squares criterion.

Various techniques can be used for optical flow analysis. These methods include phase correlation, which analyzes an inverse of normalized cross-power spectrum. Block-based methods can also be used, which minimize a sum of squared differences or sum of absolute differences, or maximize a normalized cross-correlation. Differential methods of estimating optical flow can be used, based on partial derivatives of the image signal and/or the sought flow field and higher-order partial derivatives. Examples include (1) the Lucas-Kanade method, which uses image patches and an affine model for the flow field, (2) the Horn-Schunck method, which optimizes a function based on residuals from a brightness constancy constraint, and a particular regularization term expressing the expected smoothness of the flow field, (3) the Buxton-Buxton method, which is based on a model of the motion of edges in image sequences, (4) the Black-Jepson method, which performs coarse optical flow via correlation. Other techniques include general variational methods, including a range of modifications or extensions of Horn-Schunck, using other data terms and other smoothness terms. Optical flow analysis can also be performed using discrete optimization methods, where the search space is quantized, and then image matching is addressed through label assignment at every pixel, such that the corresponding deformation minimizes the distance between the source and the target image.

The grid 536 shows example touch scores when a user's finger is moving across the display panel and the sensing pixels are operating at a high sensing rate. The optical flow analysis 534 can be used to determine a determines a different or adjusted boundary 537 in which to perform high-intensity sensing. For example, in addition to or instead of performing high-intensity sensing in the area where the user's finger is currently touching the display 120, the device 100 can shift or re-shape the boundary 537 to encompass area of the display 120 where, according to the recent trajectory of the touch, touch is expected to occur in upcoming measurement cycles. As a result, the device 100 can perform high-intensity sensing at pixels along the predicted trajectory of movement for the touch input, so that high-resolution, low-latency sensing can be performed as the touch input continues to move. As shown in the example, the device 100 can generate an updated circle or ellipse based on the touch scores of the grid 536 and the boundary 537 based on the optical flow analysis.

In general, the device 100 can iteratively select groups of pixels to use as sensing pixels (e.g., to switch between the illumination state and the sensing state) based on the predicted direction of motion determined by the optical flow analysis 534. The cycle of mapping boundaries, activating sensing pixels, and predicting touch motion can repeat while a user is touching the display 120. For example, the cycle can repeat for each image frame or at designated intervals of image frames, or for each measurement cycle performed using the sensing pixels.

By repeatedly updating the bounded regression based on predicted touch motion and the most recent touch scores, sensing pixels can be activated in anticipation of the user's finger movements. For example, pixel 538 is outside of the boundary 537 in the grid 536, and is a non-sensing pixel. The optical flow analysis 534 can predict that the user's finger is moving towards the pixel 538. The boundary mapping 524 can perform a regression based on the prediction, generating a bounded circle that includes the pixel 538. The mode switching 528 can the select to switch the pixel 538 from a non-sensing pixel to a sensing pixel. When the user's finger reaches the pixel 538, the pixel 538 is already switching between the illumination state and the sensing state, and senses the user's touch.

In contrast to the pixel 538, the pixel 539 is inside the boundary 537 in the grid 536, and is a sensing pixel with a medium touch score. The optical flow analyzer 534 can predict that the user's finger is moving away from the pixel 539. The boundary mapper 524 can perform a regression based on the prediction, generating a bounded circle that excludes the pixel 539. The mode switcher 528 can the select to switch the pixel 539 from a sensing pixel to a non-sensing pixel. When the user's finger moves away from the pixel 539, the pixel 539 is no longer switching between the illumination state and the sensing state. Thus, the user notices no distortion of the portion of the image displayed by the pixel 539.

When the user lifts the finger off of the display panel, the touch scores within the bounded area drop to low values. The grid 540 shows example touch scores when a user is no longer touching the display panel. The sensing pixels within the circle 542 all have a low touch score, e.g., of zero or near zero. When no touch is detected, the system 500 switches from the interaction mode 530 to the ambient mode 510.

In the ambient mode, the pixels that were activated as sensing pixels in the interaction mode 530 can return to operation as non-sensing pixels, except those that are part of the standard sparse grid used for initial detection of a touch. The cluster counter 512 can monitor the sensing pixels for clusters that may represent touches on the display panel.

Figure 6C:
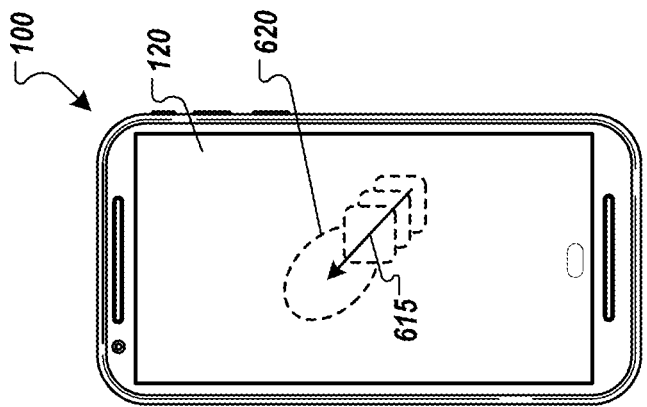
FIGS. 6A to 6C illustrate an example of a user's touch and swipe on a display panel.
Figure 6B:
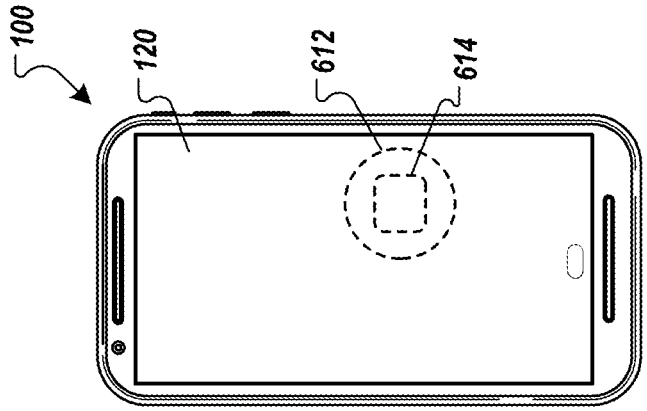
Figure 6A:
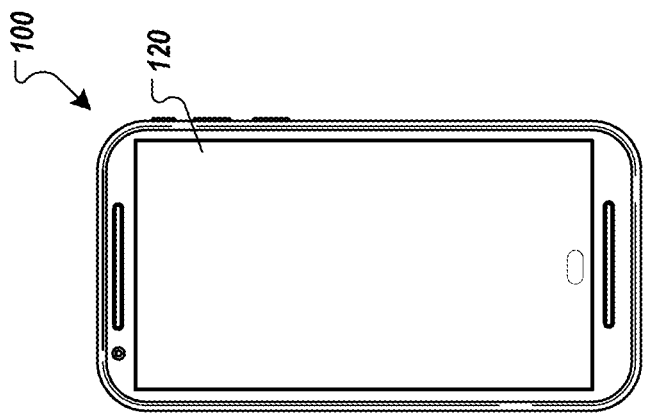

FIGS. 6A to 6C illustrate an example of a user's touch and swipe on a display panel.

FIG. 6A shows the example device 100 and display panel 120 without any touch event. In FIG. 6A, sensing pixels of the display panel switch between the illumination state and the sensing state at a low sensing rate. The low sensing rate may be, for example, 2 Hz with a duty cycle of ten percent allocated for the sensing state. Because of the short burst activation of the sensing state, the display panel will not lose the mean brightness and consistency, and the user will not notice visual jitters or artifacts.

FIG. 6B shows the example device 100 and display panel 120 when a user touch event occurs. With this first touch event, the display system performs a regression of an area 614 within the convex hull of the touch region 612 determined based on the touch scores of the sensing pixels. Pixels within the area 614 are modulated between the sensing state and illumination state with a higher sensing rate compared to the sensing rate in a no-touch condition. The higher sensing rate may be, for example, 20 Hz with a duty cycle of fifty percent allocated for the sensing state. If the higher rate were used for pixels visible to the user, the user may notice distortions in the image. However, since the area 614 is occluded from view by the finger, the user is not likely to notice any distortions.

FIG. 6C shows the example device 100 and display panel 120 when the user swipes along the display panel. The finger follows a path 615 on the display panel to create a scroll diagonal gesture. By performing an optical flow analysis (e.g., Lucas-Kanade method) on the touch score heat map, the display system determines that the finger is moving towards the north-west direction of the display panel. By applying the directional parameters to an elliptical form, a predicted area 620 is generated for a higher rate of modulation and a higher density of sensing. Pixels within the predicted area 620 can be pre-emptively switched to a higher sensing rate (and/or can have higher density of pixels used for sensing) in anticipation of the user's movements. Pixels that are outside of the predicted area 620 can be pre-emptively switched back to the lower sensing rate and/or to a lower density of pixels used for sensing. Thus, even when the user is scrolling and moving the fingers quickly, there is minimal compromise on the visual quality of the displayed image as the system achieves a tight constraint of fast modulation only around the user touch.

Figure 7:
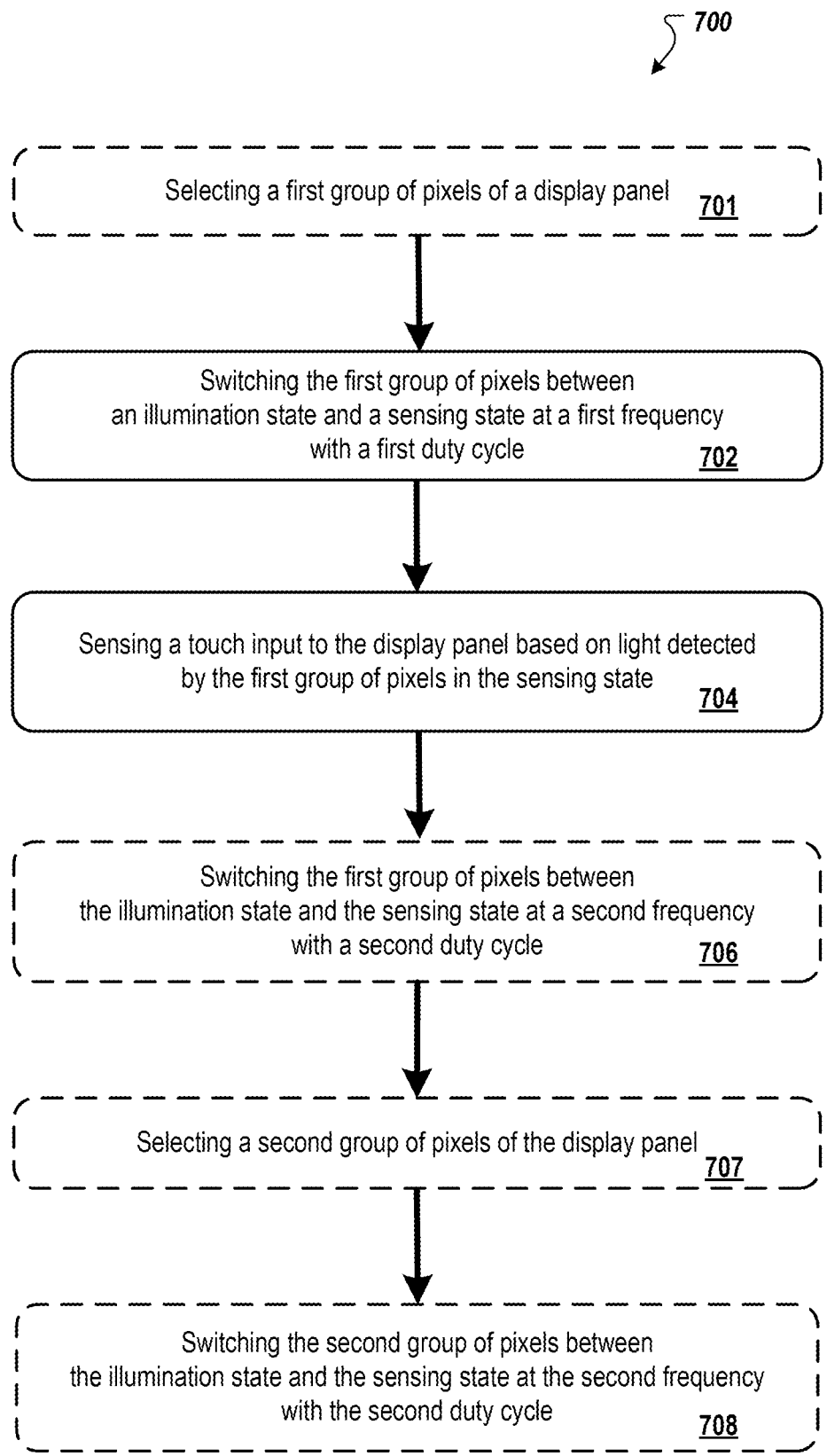
FIG. 7 is a flow diagram of an example process for using an under-display LED array as a dual screen-sensor input surface.

FIG. 7 is a flow chart of an example process 700 for using the LED array of a display as a both a screen and a sensor for user input. The process 700 can be performed by components of a display system. For example, the process 700 can be performed by the driver 210 or the SoC 202 of the display system 200. In some implementations, some steps of the process 700 can be performed by the driver 210, and other steps of the process 700 can be performed by the SoC 202.

The process 700 optionally includes selecting a first group of pixels of a display panel (701). For example, referring to FIG. 4A, a first group of pixels includes pre-touch sensing pixels 402. The first group of pixels can be selected to provides a consistent, regular distribution of sensing pixels on the display. The spacing of sensing pixels can be set according to the accuracy needs of the display. In some examples, a specific group of pixels is designated for repeated use as sensing pixels when no touch input is provided.

The process 700 includes switching the first group of pixels of the display panel between an illumination state and a sensing state at a first frequency with a first duty cycle (702). For example, referring to FIG. 4A, the pre-touch sensing pixels 402 switch between an illumination state and a sensing state at a first frequency with a first duty cycle, as illustrated in FIG. 4C.

The process 700 includes sensing a touch input to the display panel based on light detected by the first group of pixels in the sensing state (704). For example, referring to FIG. 4C, a touch input can be detected based on light detected by a subset of the pre-touch sensing pixels 402. The subset can include the pre-touch/post-touch sensing pixels 406, which detect light of a lower illuminance when occluded by a finger touch. The lower detected illuminance results in high touch scores for the pre-touch/post-touch sensing pixels 406.

The process 700 optionally includes switching the first group of pixels between the illumination state and the sensing state at a second frequency with a second duty cycle (706). In some examples, a subset of the first group of pixels is switched between the illumination state and the sensing state at the second frequency with the second duty cycle. The subset of the first group of pixels can be a group of pixels that are at and near the detected touch input. For example, based on detecting the touch input, the pre-touch/post-touch sensing pixels 406 can be switched between the illumination state and the sensing state at a second frequency with a second duty cycle, as illustrated in FIG. 4D. The second frequency is higher than the first frequency, and the second duty cycle is higher than the first duty cycle.

The process 700 optionally includes selecting a second group of pixels of the display panel (707). For example, referring to FIG. 4B, a second group of pixels includes post-touch sensing pixels 404. The post-touch sensing pixels 404 of the second group of pixels can be selected based on being located within the touch region of the initial touch input to the display panel. The number of post-touch sensing pixels per unit of area or linear distance on the display is greater than the number of pre-touch sensing pixels per unit of area or linear distance on the display.

The process 700 optionally includes switching the second group of pixels between the illumination state and the sensing state at a second frequency with a second duty cycle (708). For example, referring to FIG. 4B, the post-touch sensing pixels 404 can be activated to switch between the illumination state and the sensing state at the second frequency with the second duty cycle. The second group of pixels operating at a higher frequency and/or duty cycle provides a localized increase in the density of sensing pixels while the touch is ongoing.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver which can communicate with the one or more networks to send and receive data.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products, e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for sensing a touch on a display panel, the display panel including an array of pixels comprising light emitting diodes (LEDs), the method comprising:

controlling first pixels from the array of pixels to operate in an illumination state in which LEDs of the first pixels are forward biased to emit light;

selecting, from the array of pixels, pixels to be operated as second pixels to sense touch input, wherein the second pixels are selected based on content in an image frame presented by the display panel;

controlling the second pixels to repeatedly switch between operating in the illumination state and operating in a sensing state, wherein the second pixels include pixels that are interspersed with the first pixels in the array of pixels, wherein operating the second pixels in the illumination state comprises forward biasing the LEDs of the second pixels to emit light, and wherein operating the second pixels in the sensing state comprises reverse biasing the LEDs of the second pixels to detect light;

varying which pixels of the array of pixels are operated as the second pixels to sense touch input over time based on changes to content displayed by the display panel over time;

generating sensing signals indicative of levels of light detected by the second pixels while the second pixels operate in the sensing state;

detecting a touch input to the display panel based on the generated sensing signals indicative of levels of light detected by the second pixels; and in response to detecting the touch input to the display panel, changing at least one of (i) a frequency at which the second pixels switch between operating in the illumination state and operating in the sensing state, (ii) a duty cycle for operating the second pixels in the sensing state, or (iii) which of the pixels in the array of pixels are controlled to switch between operating in the illumination state and operating in the sensing state.

2. The method of claim 1, wherein controlling the first pixels comprises controlling the first pixels over a period of time in which the first pixels provide visual output of the display panel and in which the first pixels are not operated in the sensing state; and wherein controlling the second pixels comprises controlling the second pixels to perform multiple cycles of switching between the illumination state and the sensing state during the period of time.

3. The method of claim 1, wherein, when operating in the illumination state, the second pixels provide visual output of the display panel concurrent with the first pixels providing visual output of the display panel; and wherein, when operating in the sensing state, the second pixels sense light incident to the second pixels concurrent with the first pixels providing visual output of the display panel.

4. The method of claim 1, wherein generating the sensing signals comprises generating a sensing signal for each of the second pixels to indicate a level of light detected by the pixel; and wherein detecting the touch input to the display panel comprises:

evaluating the sensing signals to determine whether the sensing signals respectively indicate a level of light below one or more thresholds; and detecting the touch input based on identifying a subset of the second pixels for which the sensing signals indicate a level of light below the one or more thresholds.

5. The method of claim 1, wherein detecting the touch input to the display panel comprises:

based on the sensing signals, identifying a subset of the second pixels for which the sensing signals indicate a reduction in the detected level of light or a detected level of light below a threshold; and determining a location of the touch input on the display panel based on locations in the array of pixels of the second pixels in the identified subset of the second pixels.

6. The method of claim 1, wherein detecting the touch input to the display panel comprises detecting a size, a shape, and a location of the touch input on the display panel based on the generated sensing signals.

7. The method of claim 1, further comprising:

while the touch input is provided to the display panel, continuing to switch the second pixels between operating in the illumination state and operating in the sensing state, wherein sensing signals are generated for the second pixels for each of multiple periods of operating the second pixels in the sensing state while the touch input is provided to the display panel; and tracking movement of the touch input along the display panel based on the sensing signals determined over the multiple periods of operating the second pixels in the sensing state.

8. The method of claim 1, wherein generating the sensing signals comprises generating, for each of the second pixels, a sensing signal based on a voltage or current across an LED of the second pixel while the LED is in a reverse-biased condition.

9. The method of claim 1, wherein controlling the second pixels to repeatedly switch between operating in the illumination state and operating in the sensing state comprises switching the second pixels between the illumination state and the sensing state to initiate sensing at a predetermined frequency or to achieve a predetermined duty cycle for operation of the second pixels in the sensing state.

10. The method of claim 1, wherein the first pixels are pixels that are not selected as the second pixels to be used to sense touch input, the method further comprising:

selecting a frequency at which to perform sensing operations using the second pixels; and selecting a duty cycle at which to operate the second pixels in the sensing state;

wherein controlling second pixels comprises driving the second pixels to initiate operation in the sensing state at the selected frequency and to maintain the second pixels operating in the sensing state with durations set to achieve the selected duty cycle.

11. The method of claim 1, wherein the second pixels are spaced apart in a regular pattern, with one or more first pixels separating the second pixels.

12. The method of claim 1, further comprising:

using the same selected set of pixels as the second pixels for multiple cycles that each include a period of operation in the illumination state and operation in the sensing state.

13. The method of claim 1, wherein a set of pixels in the array of pixels are each configured to be able to selectively operate in the illumination state and in the sensing state; and wherein the method includes selecting a proper subset from the set of pixels in the array as the second pixels that are switched between the illumination state and the sensing state, and wherein the other pixels from the set of pixels that are not in the proper subset are selected as first pixels to operate in the illumination state without switching to the sensing state.

14. The method of claim 1, comprising identifying portions of the image frame that have a color of a predetermined value or in a predetermined range or that have an intensity or brightness that satisfies a threshold;

wherein selecting the pixels to be operated as the second pixels comprises selecting, as second pixels, at least some pixels of the array of pixels that are located to present identified portions of the image frame determined to have a color of the predetermined value or in the predetermined range or that have an intensity or brightness that satisfies the threshold.

15. The method of claim 1, comprising:
selecting, from the array of pixels, different pixels to be operated as the second pixels to sense touch input during presentation of a second image frame on the display panel.

16. The method of claim 1, comprising:
detecting movement of the touch input to the display panel based on light detected by the second pixels;
based on detecting the movement of the touch input, determining a predicted direction of motion of the touch input using optical flow analysis; and
selecting groups of pixels to switch between the illumination state and the sensing state based on the predicted direction of motion.

17. The method of claim 1, wherein the second pixels comprise one percent or less of the pixels of the array of pixels.

18. A device comprising:
a display panel comprising an array of pixels comprising light emitting diodes (LEDs); and
a driver configured to use the LEDs to provide illumination and to sense touch input to the device;
wherein the device is configured to perform operations comprising:
controlling first pixels from the array of pixels to operate in an illumination state in which LEDs of the first pixels are forward biased to emit light;
selecting, from the array of pixels, pixels to be operated as second pixels to sense touch input, wherein the second pixels are selected based on content in an image frame presented by the display panel;
controlling the second pixels to repeatedly switch between operating in the illumination state and operating in a sensing state, wherein the second pixels include pixels that are interspersed with the first pixels in the array of pixels, wherein operating the second pixels in the illumination state comprises forward biasing the LEDs of the second pixels to emit light, and wherein operating the second pixels in the sensing state comprises reverse biasing the LEDs of the second pixels to detect light;
varying which pixels of the array of pixels are operated as the second pixels to sense touch input over time based on changes to content displayed by the display panel over time;

generating sensing signals indicative of levels of light detected by the second pixels while the second pixels operate in the sensing state;
detecting a touch input to the display panel based on the generated sensing signals indicative of levels of light detected by the second pixels; and
in response to detecting the touch input to the display panel, changing at least one of (i) a frequency at which the second pixels switch between operating in the illumination state and operating in the sensing state, (ii) a duty cycle for operating the second pixels in the sensing state, or (iii) which of the pixels in the array of pixels are controlled to switch between operating in the illumination state and operating in the sensing state.

19. One or more non-transitory machine-readable media storing instructions that are operable, when executed by one or more processors of a device, to cause the device to perform operations comprising:
controlling first pixels from an array of pixels of a display panel to operate in an illumination state in which light emitting diodes (LEDs) of the first pixels are forward biased to emit light;
selecting, from the array of pixels, pixels to be operated as second pixels to sense touch input, wherein the second pixels are selected based on content in an image frame presented by the display panel;
controlling the second pixels to repeatedly switch between operating in the illumination state and operating in a sensing state, wherein the second pixels include pixels that are interspersed with the first pixels in the array of pixels, wherein operating the second pixels in the illumination state comprises forward biasing the LEDs of the second pixels to emit light, and wherein operating the second pixels in the sensing state comprises reverse biasing the LEDs of the second pixels to detect light;
varying which pixels of the array of pixels are operated as the second pixels to sense touch input over time based on changes to content displayed by the display panel over time;
generating sensing signals indicative of levels of light detected by the second pixels while the second pixels operate in the sensing state;
detecting a touch input to the display panel based on the generated sensing signals indicative of levels of light detected by the second pixels; and
in response to detecting the touch input to the display panel, changing at least one of (i) a frequency at which the second pixels switch between operating in the illumination state and operating in the sensing state, (ii) a duty cycle for operating the second pixels in the sensing state, or (iii) which of the pixels in the array of pixels are controlled to switch between operating in the illumination state and operating in the sensing state.

* * * * *